United States Patent
Sanders

(10) Patent No.: US 11,638,894 B2
(45) Date of Patent: May 2, 2023

(54) FILTER BOX, AND METHOD OF INSULATING A FILTER BOX

(71) Applicant: Mitsubishi Electric US, Inc., Cypress, CA (US)

(72) Inventor: William Sanders, Roswell, GA (US)

(73) Assignee: MITSUBISHI ELECTRIC US, INC., Cypress, CA (US)

( * ) Notice: Subject to any disclaimer, the term of this patent is extended or adjusted under 35 U.S.C. 154(b) by 338 days.

(21) Appl. No.: 16/934,449

(22) Filed: Jul. 21, 2020

(65) Prior Publication Data

US 2022/0023786 A1  Jan. 27, 2022

(51) Int. Cl.
*B01D 46/00* (2022.01)
*B01D 46/10* (2006.01)
*B01D 46/52* (2006.01)

(52) U.S. Cl.
CPC ..... *B01D 46/0005* (2013.01); *B01D 46/0001* (2013.01); *B01D 46/10* (2013.01); *B01D 46/523* (2013.01); *B01D 2271/025* (2013.01)

(58) Field of Classification Search
CPC ............ B01D 46/0005; B01D 46/0001; B01D 46/10; B01D 46/523; B01D 2271/025; B01D 46/52; B01D 46/54; B01D 46/42; B01D 53/04; B01D 53/81; B01D 53/72; B01D 53/86; B01D 46/0002; B01D 46/0004; B01D 46/0006; F24F 12/00; F24F 12/001; B24F 13/28; B32B 21/00; B32B 21/72; B32B 23/08
USPC ........................................... 55/497, 451, 481
See application file for complete search history.

(56) References Cited

U.S. PATENT DOCUMENTS

| 5,176,570 A | * | 1/1993 | Liedl | ...................... F24F 13/28 55/502 |
| 7,524,546 B2 | | 4/2009 | Aizawa et al. | |
| 2012/0111197 A1 | * | 5/2012 | Weisman | ........... B01D 46/0009 55/505 |
| 2019/0046909 A1 | | 2/2019 | Haas et al. | |

FOREIGN PATENT DOCUMENTS

| CN | 207886855 U | * | 9/2018 |
| CN | 208049575 U | | 11/2018 |
| DE | 10 2005 034 303 A1 | | 2/2007 |
| JP | 2000-005528 A | | 1/2000 |
| KR | 100906326 B1 | | 7/2009 |
| KR | 20170112964 A | * | 10/2017 |
| KR | 20170112964 A | | 10/2017 |

* cited by examiner

*Primary Examiner* — Robert A Hopkins
*Assistant Examiner* — Qianping He
(74) *Attorney, Agent, or Firm* — Posz Law Group, PLC

(57) ABSTRACT

A filter box mounts to an air intake opening of an air handler. The filter box includes an inner shell, insulator, and an outer shell. The inner shell is adapted to confine one or more filters therein. The inner shell defines an airflow channel from a front end opening of the inner shell through the filter(s) to a rear end opening of the inner shell. The outer shell defines a chamber from a front end opening of the outer shell to a rear end opening of the outer shell. The outer shell contains the inner shell in the chamber and the insulator is sandwiched between the outer shell and the inner shell. The inner shell and the outer shell are separated and spaced apart all over by the insulator and the insulator insulates and seals the inner shell from the outer shell.

15 Claims, 19 Drawing Sheets

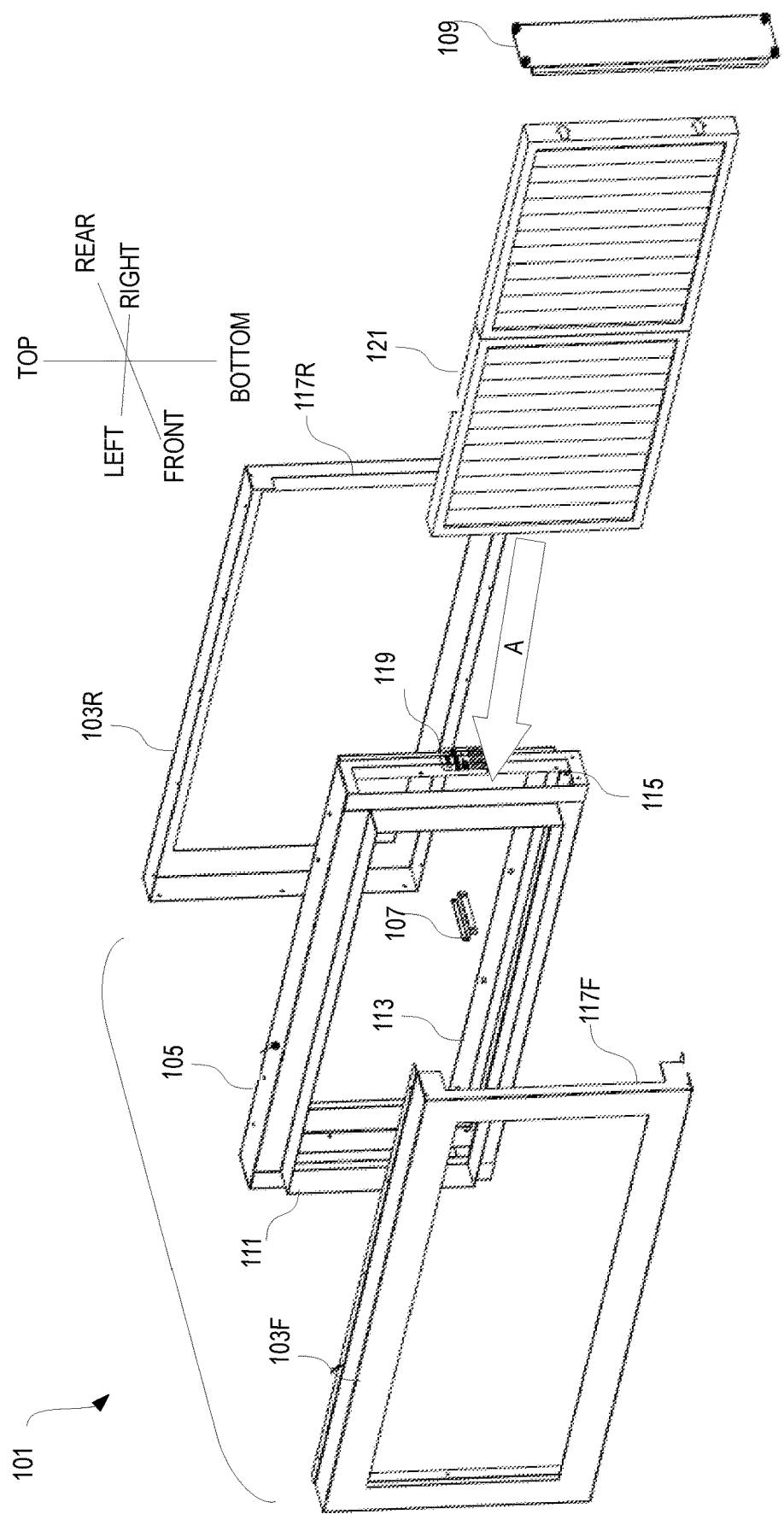

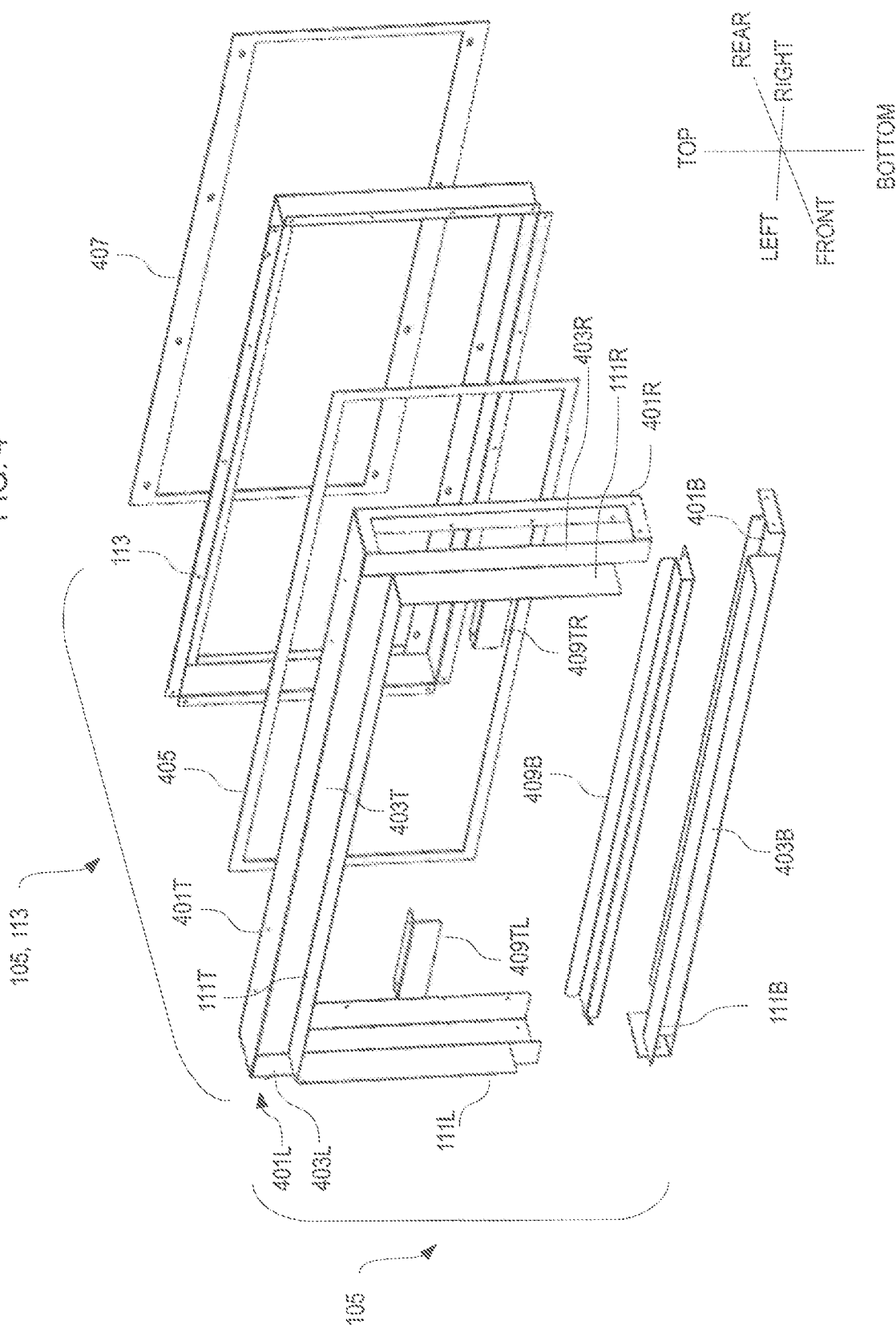

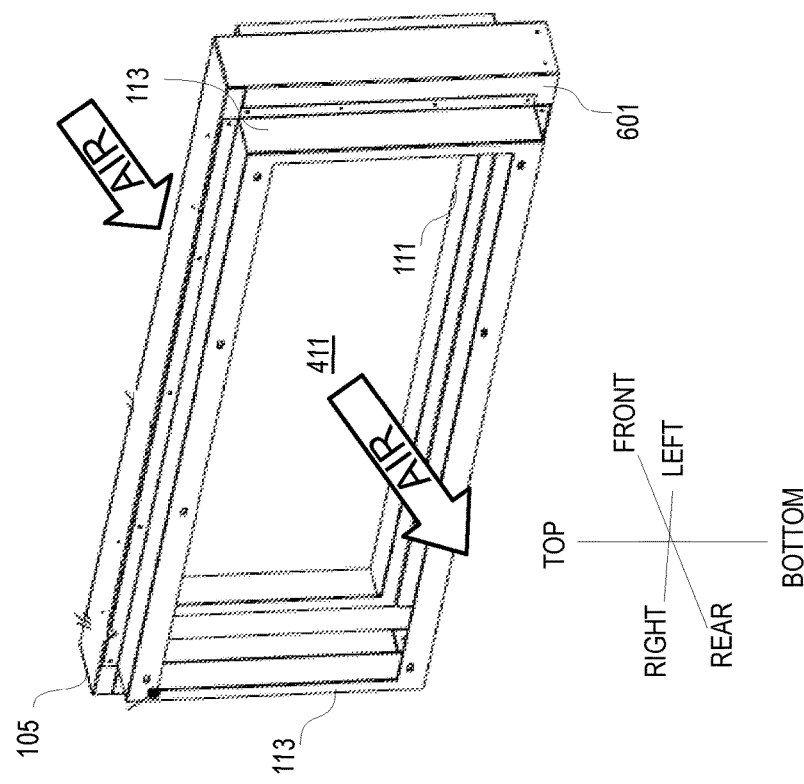
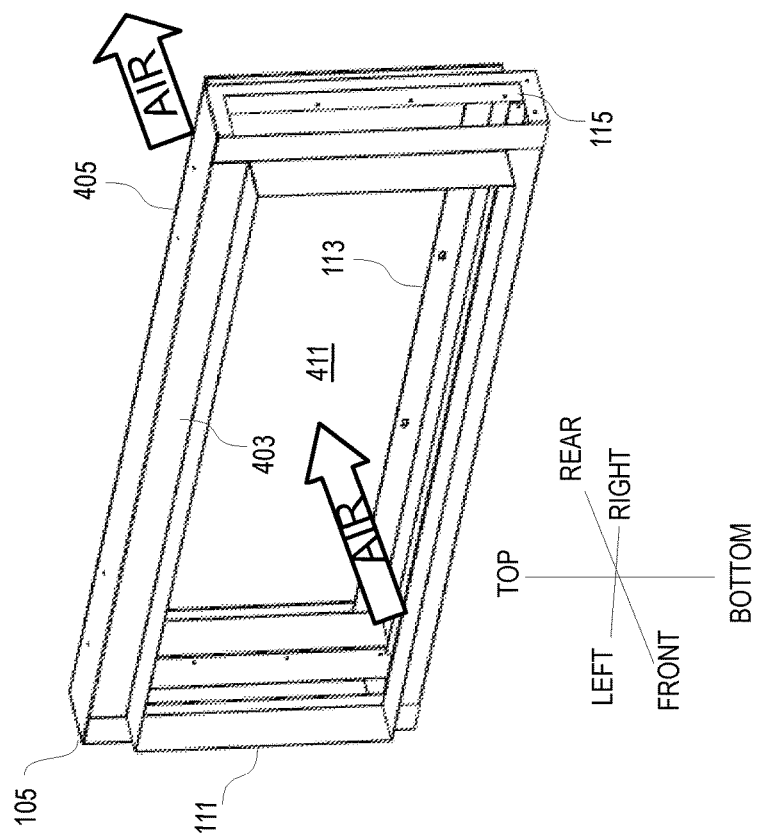

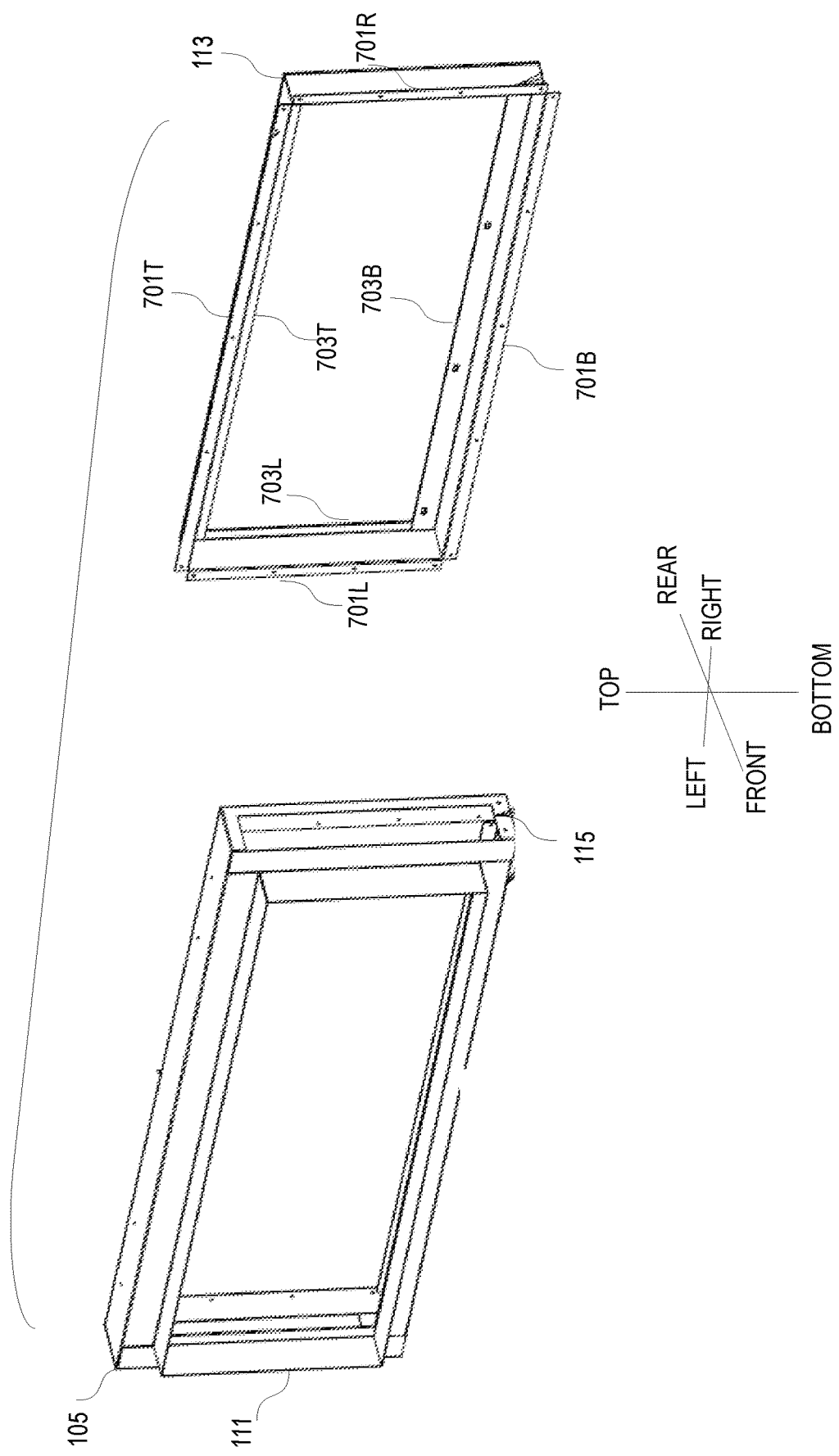

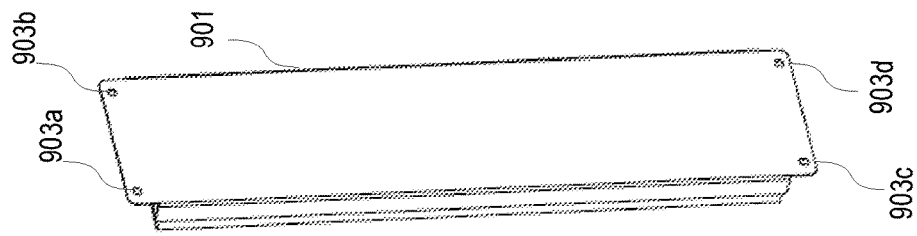
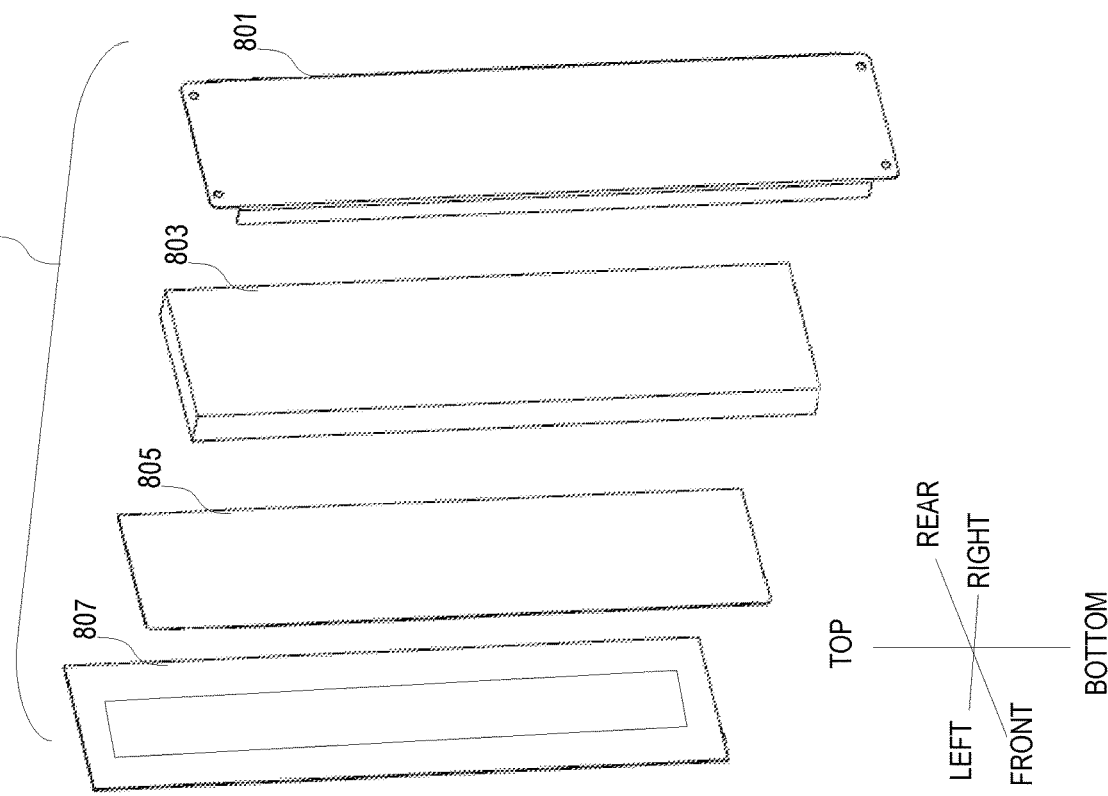

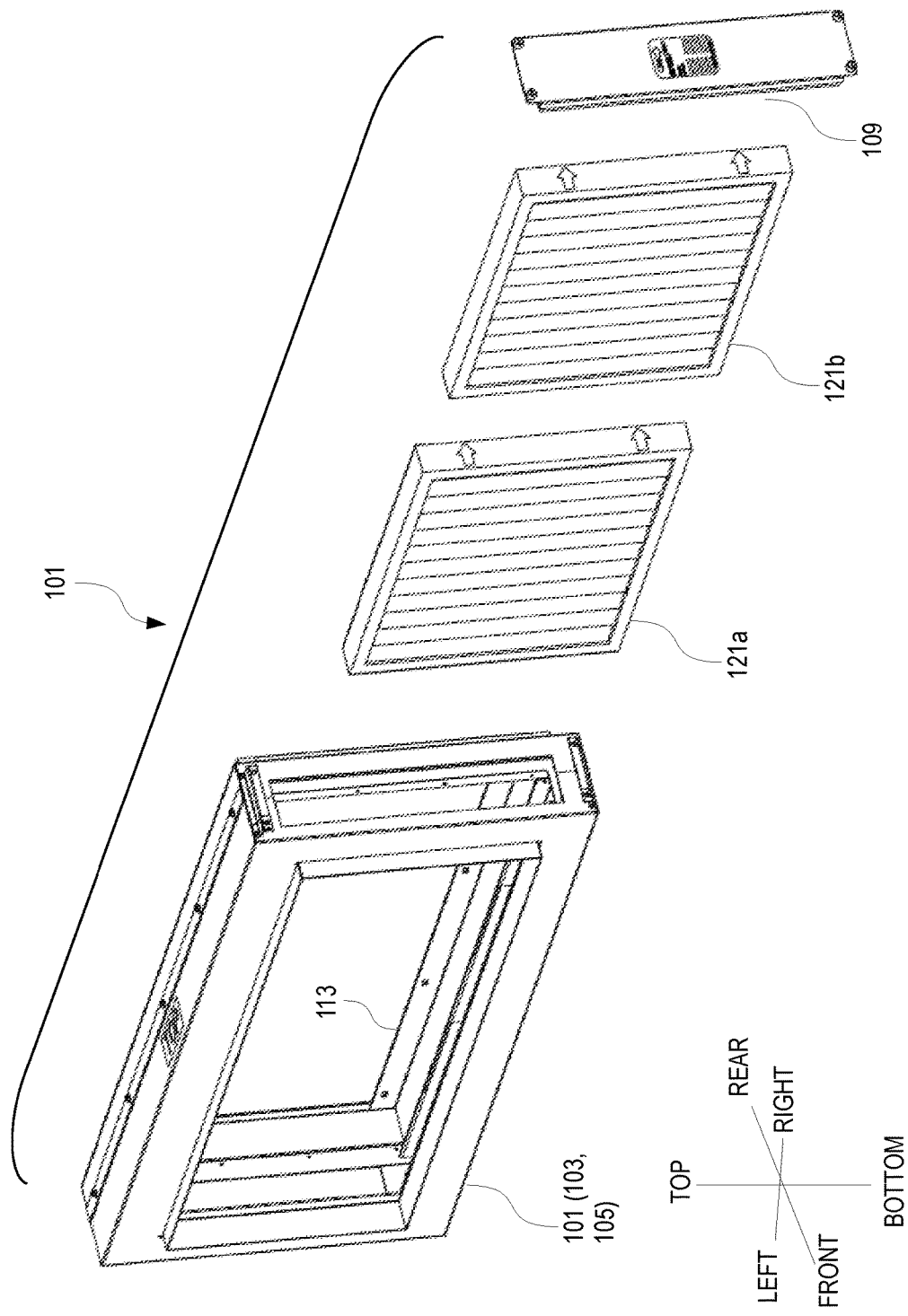

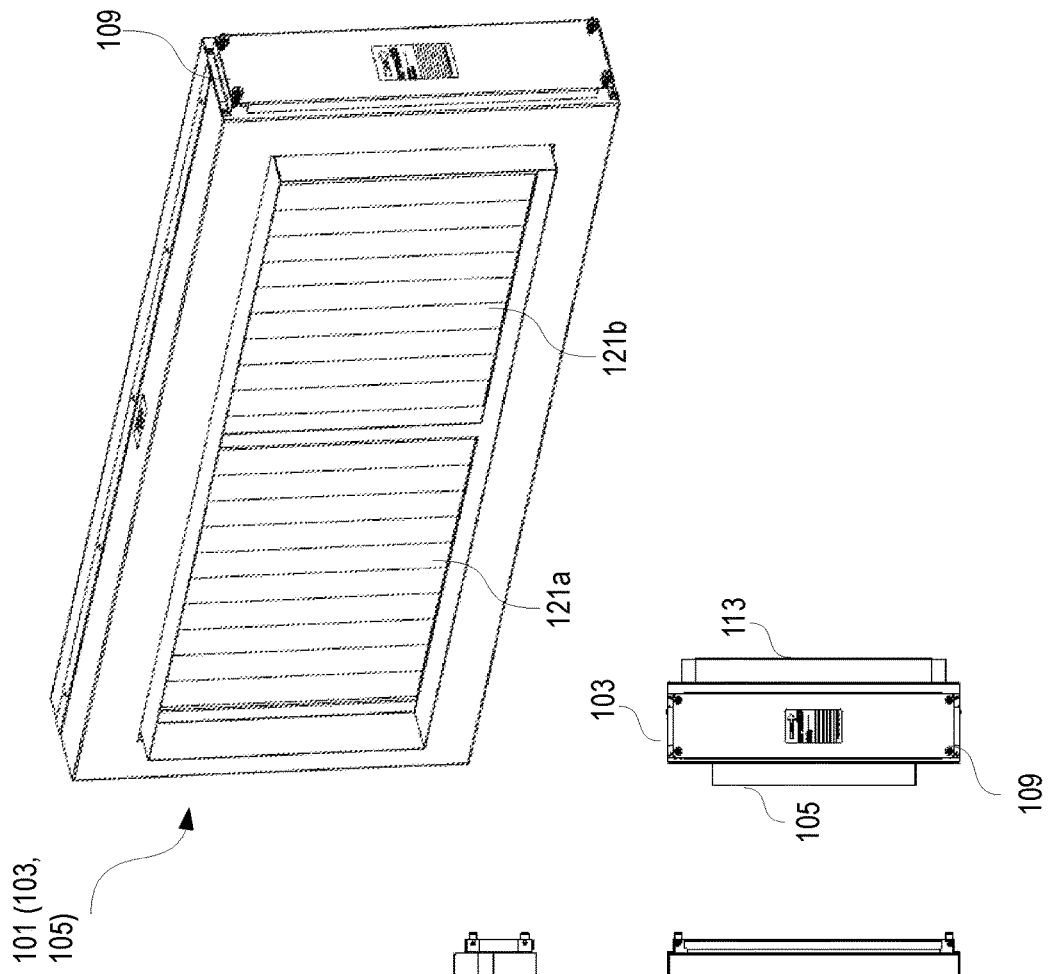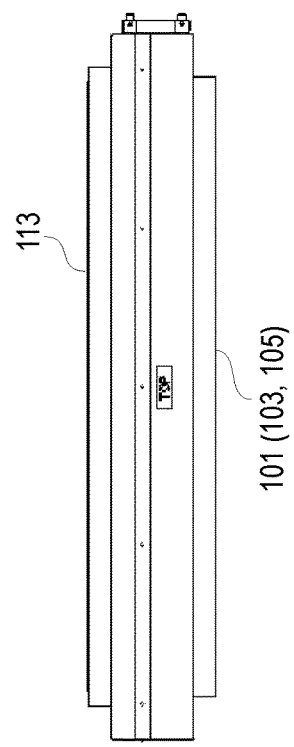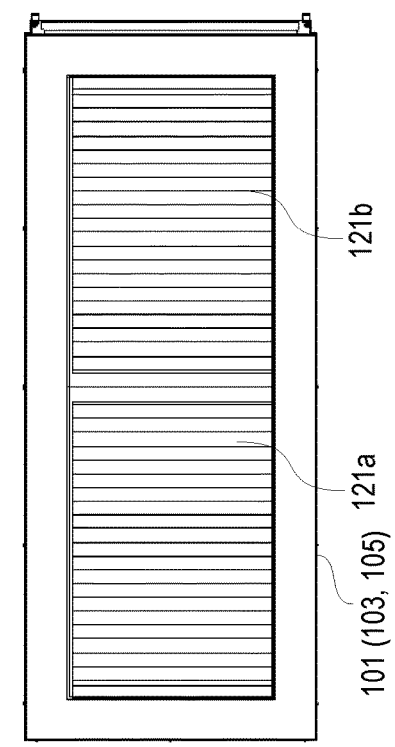

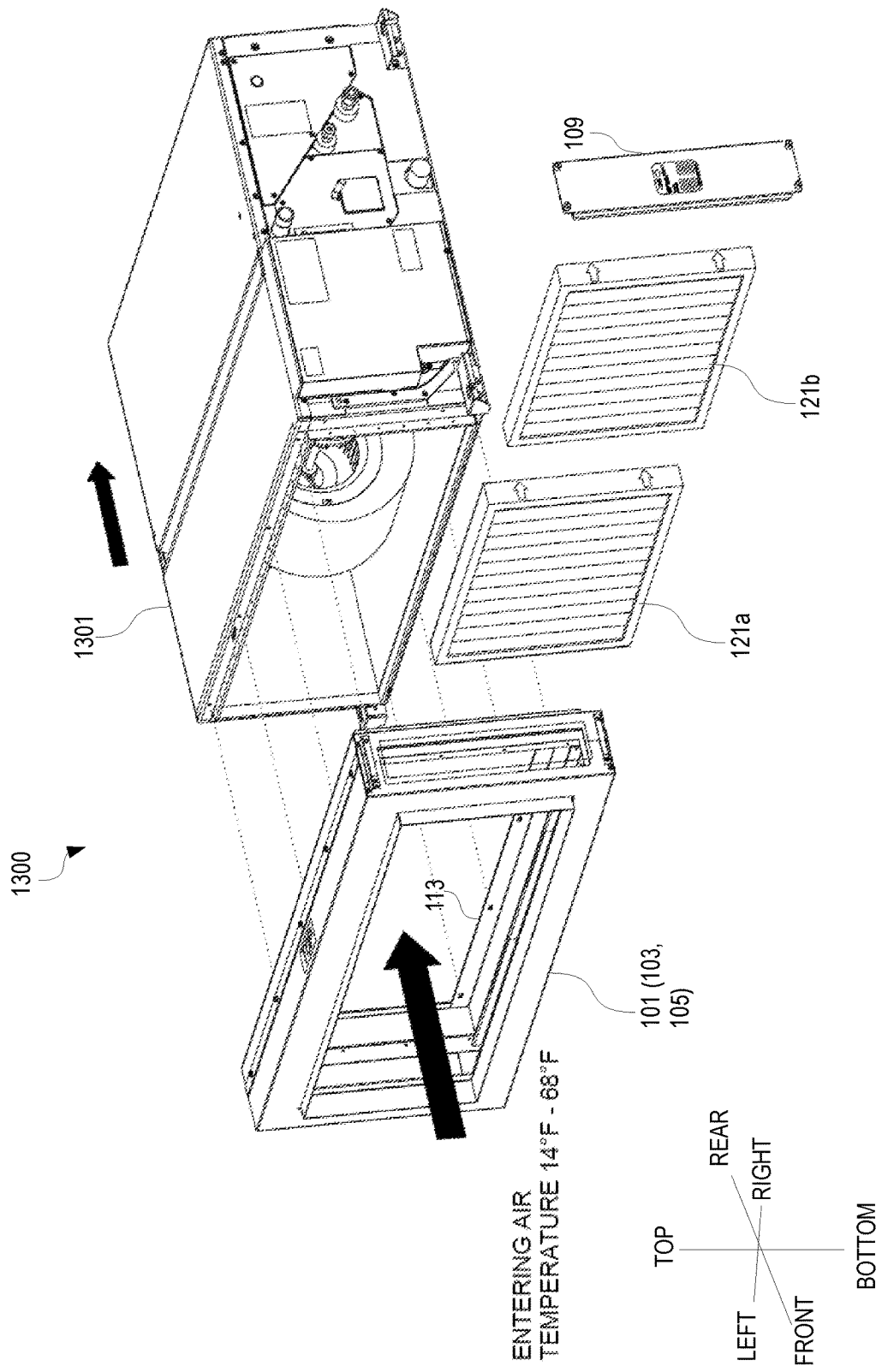

FILTER BOX, AND METHOD OF INSULATING A FILTER BOX

TECHNICAL FIELD

The subject matter described below relates generally to a filter box for an air handler.

BACKGROUND

An air handler uses a filter, typically placed first in the airflow, to keep downstream components clean and to maintain the quality of the air provided by the air handler to, for example, an air conditioning system. The filter collects contaminants such as dust, pollen, and other solid particulates particles, and may be periodically replaced with a fresh filter to maintain the quality of the air which is sucked in to the air handler through the filter.

A filter box may be provided to retain the filter at an appropriate position at the air intake of the air handler, to allow filtered air to flow through to the air handler. The filter prevents the unwanted contaminants in the airflow from entering the air handler.

Generally, in cold conditions, cold air travels through the inside of the equipment (such as the filter box) and the outside of the equipment is exposed to higher temperatures, and the temperature difference results in condensation in the equipment. A conventional filter box gets condensed due to the temperature difference, and the condensation decreases the efficiency of the air handler and the entire system. Covering the conventional filter box with insulation material can reduce the difference in temperature on the surface of the filter box and reduce condensation. Sometimes an installer will insulate a filter box by wrapping it with insulation at the time of installation in the field. Such filter boxes, even if field-insulated, still experience condensation.

Consequently, there remains a need for a production insulated filter box. There further is a need for a filter box which eliminates condensation in such conditions. Conveniently, such a filter box may have a compact design for easy installation.

SUMMARY

According to one or more embodiments, a filter box is adapted for mounting to an air intake opening of an air handler, the filter box is adapted to receive at least one filter therein, the filter box comprising: an inner shell adapted to confine the at least one filter therein, the inner shell defining an airflow channel from a front end opening of the inner shell through the at least one filter to a rear end opening of the inner shell; an insulator; and an outer shell defining a chamber from a front end opening of the outer shell to a rear end opening of the outer shell. The outer shell contains the inner shell in the chamber and the insulator is sandwiched between the outer shell and the inner shell. The inner shell and the outer shell are separated and spaced apart all over by the insulator and the insulator insulates and seals the inner shell from the outer shell.

The front end opening of the inner shell may comprise a flange that protrudes the airflow channel beyond outside the outer shell, the flange protrudes beyond the front end opening of the outer shell.

The filter box may further comprise a common access door through the inner shell, insulator and outer shell, the common access door in an opened position slidably receives the at least one filter into the airflow channel, the common access door in a closed position seals the common access door to the airflow channel.

The inner shell may further comprise an adaptor that positions the airflow channel of the inner shell to the air intake opening.

The filter box may further comprise a filter gasket that seals the airflow channel of the inner shell to the adaptor, and a unit gasket that seals the adaptor to the air intake opening.

The outer shell may include a front outer half-shell and a rear outer half-shell fastened together around the insulated inner shell, and the insulator is compressed between the outer shell and the inner shell.

In another embodiment, an air conditioning apparatus is provided, comprising: an air handler; and the filter box as disclosed in one or more of the foregoing paragraphs in this section mounted to the air intake opening of the air handler.

The air conditioning apparatus may further comprise the at least one filter confined in the filter box.

Another embodiment provides a method of insulating a filter box for an air handler, comprising: providing an inner shell adapted to confine at least one filter therein, the inner shell defining an airflow channel from a front end opening of the inner shell through the at least one filter to a rear end opening of the inner shell; disposing an insulator on the inner shell; installing around the insulated inner shell, a front outer half-shell and a rear outer half-shell to form an outer shell that defines a chamber from a front end opening of the outer shell to a rear end opening of the outer shell, the outer shell contains the insulated inner shell in the chamber and the insulator is sandwiched between the outer shell and the inner shell, the inner shell and the outer shell are separated and spaced apart all over by the insulator; and affixing together the front outer half-shell and the rear outer half-shell around the insulated inner shell to form the filter box, the insulator is compressed between the outer shell and the inner shell and insulates and seals the inner shell from the outer shell.

In an embodiment, the filter box may include a common access door through the inner shell, insulator and outer shell, the method further comprising slidably transferring the at least one filter into the airflow channel through the common access door in an open position; and closing the common access door to seal the common access door to the air flow channel.

The method may further comprise, prior to providing the inner shell, assembling, in this order, a filter gasket on the rear end opening of the inner shell, an adaptor on the filter gasket, and a unit gasket on the adaptor.

The method may further comprise, after forming the filter box, mounting the adaptor to an air intake opening of the air handler.

In the method, the inner shell may comprise a flange protruding forward at the front end opening of the inner shell, and, after installing the inner shell, the flange protrudes the airflow channel to outside the outer shell, wherein the flange protrudes beyond the front end opening of the outer shell.

The method may further comprise mounting the filter box to an air intake opening of the air handler.

The method may further comprise operating the air handler to force air through the at least one filter confined in the air channel.

BRIEF DESCRIPTION OF THE DRAWINGS

The accompanying figures, where like reference numerals refer to identical or functionally similar elements and which together with the detailed description below are incorporated in and form part of the specification, serve to further illustrate an exemplary embodiment and to explain various principles and advantages in accordance with the present disclosure.

FIG. 1 is an isometric exploded view illustrating a filter box with filter;

FIG. 4 is a front isometric exploded view illustrating an inner shell:

FIG. 5 is a front isometric view illustrating an assembled inner shell;

FIG. 6 is a rear isometric view illustrating an assembled inner shell;

FIG. 7 is an isometric view illustrating an adaptor exploded from an inner shell;

FIG. 8 is an isometric exploded view illustrating a door;

FIG. 9 is an isometric view illustrating an assembled door:

FIG. 16 is an isometric front view illustrating an assembled filter box with a filter for insertion;

FIG. 17A is an front isometric view illustrating an assembled filter box and a filter;

FIG. 17B is a top view illustrating the assembled filter box and the filter;

FIG. 17C is a front view illustrating the assembled filter box and the filter;

FIG. 17D is a right side view illustrating the assembled filter box and the filter;

FIG. 18 is an isometric view illustrating an air conditioning apparatus;

DETAILED DESCRIPTION

I. Introduction

Figure 3:
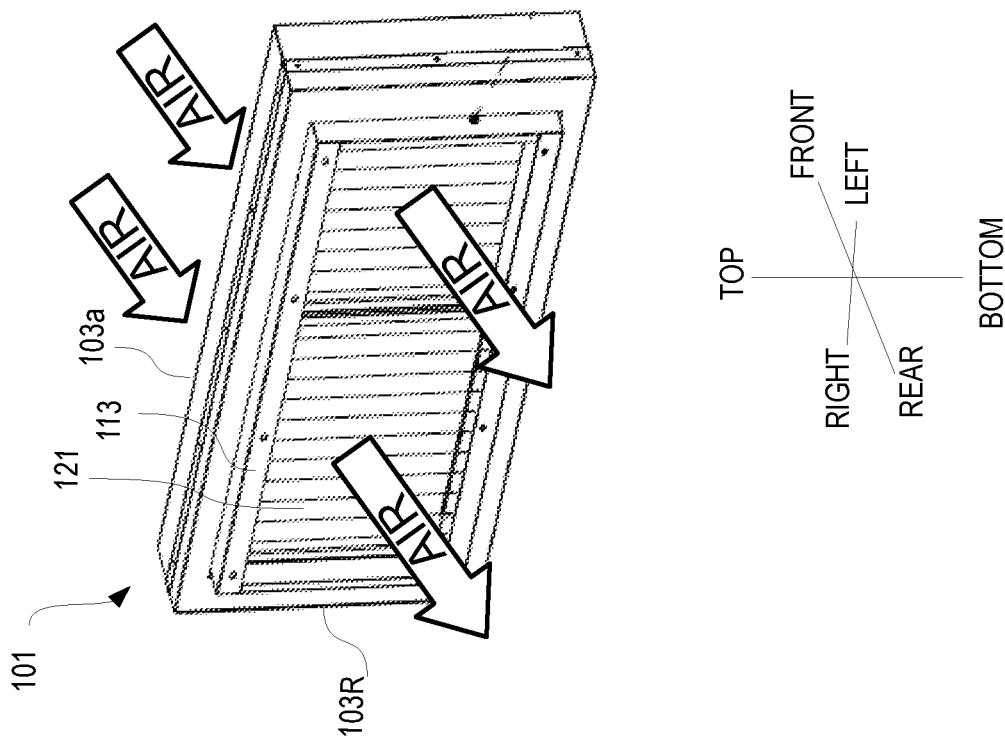
FIG. 3 is a rear isometric view illustrating an assembled filter box with filter.

In overview, the present disclosure concerns an insulated filter box, which, in cold conditions, significantly reduces or eliminates condensation. The insulated filter box includes an inner shell, for example made of a rigid material, which holds the actual filter in the airflow, and is then covered in insulation material that is itself confined by an outer shell, which is made of the rigid material. The outer shell captures and protects the insulation material. The insulated filter box with inner shell, outer shell, and insulator, is provided as a unit. In a typical operation, the filter itself is in a vertical position in the insulated filter box, but the orientation of the filter is not material to the protection from condensate. In the configuration of the inner shell and the outer shell with the insulation material sandwiched between, there is no contact between the inner shell and outer shell, which results in the elimination of thermal breaches between the inner shell and the outer shell.

The insulated filter box described herein can eliminate condensation in cold conditions. Cold air travels through a filter box and thus the interior of the box is exposed to low temperatures, while the outside of the box is exposed to higher temperatures. In a conventional filter box, the difference in temperatures causes condensation and the filter box sweats. Covering the inner shell of the filter box with insulation material will keep the outer shell warm and can eliminate condensation. In order to achieve this, there must not be any thermal breaches between the inside shell and the outer shell. That said, there is not any thermal contact between the cold inside air (which cools the inner shell) and the warmer outside air (which warms the outer shell).

More particularly, various inventive concepts and principles are embodiments in systems, devices, and methods therein which provide a filter box that solves a condensation problem that conventional filter boxes have in cold temperatures, and also has improved performance and is easier to install than a conventional filter box. The inventive filter box can eliminate condensation using an inner shell to confine the filter in position in the airflow channel to the air handler, an outer shell, and insulation sandwiched between the inner and outer shells so that there is no thermal breach between the inner and outer shells. Such a filter box can have a compact design and can be easy to install.

The instant disclosure is provided to further explain in an enabling fashion the best modes of performing one or more embodiments. The disclosure is further offered to enhance an understanding and appreciation for the inventive principles and advantages thereof, rather than to limit in any manner the embodiments.

It is further understood that the use of relational terms, such as first and second, if any, are used to distinguish one from another entity, item, or action without necessarily requiring or implying any actual such relationship or order between such entities, items or actions. Some embodiments may include a plurality of processes or steps, which can be performed in any order unless expressly and necessarily limited to a particular order (i.e., processes or steps that are not so limited may be performed in any order).

As further discussed herein below, various inventive principles and combinations thereof are advantageously employed to provide an insulated filter box which is adapted for mounting to an air intake opening of an air handler, in which the filter box includes an inner shell, an outer shell, insulation sandwiched between the inner and outer shells, and no thermal breach between the inner and outer shells.

II. State of the Art and Observations

Conventionally, if a filter box is exposed to cold air the installers of the equipment will insulate the box out in the field, for example by wrapping the filter box in some amount of insulation. Cold air travels through the unit and the outside of the conventional filter box is exposed to higher temperatures which causes condensation and the filter box sweats. A production insulated filter box does not exist. Many companies make their own filter boxes to match their own air handler. An installer might apply insulation in the field to a conventional filter box. Using just a conventional filter box without field-applied insulation may result in condensation. Furthermore, there is no guaranteed performance of the conventional filter box as to temperatures in which the filter box may be used without condensation. The conventional filter box does not have an outer shell. The conventional filter box would have a thermal breach, but nevertheless there is no discussion where the thermal breaches exist in the conventional filter box since the problem caused by thermal breaches in a filter box has not previously been appreciated.

Figure 20:
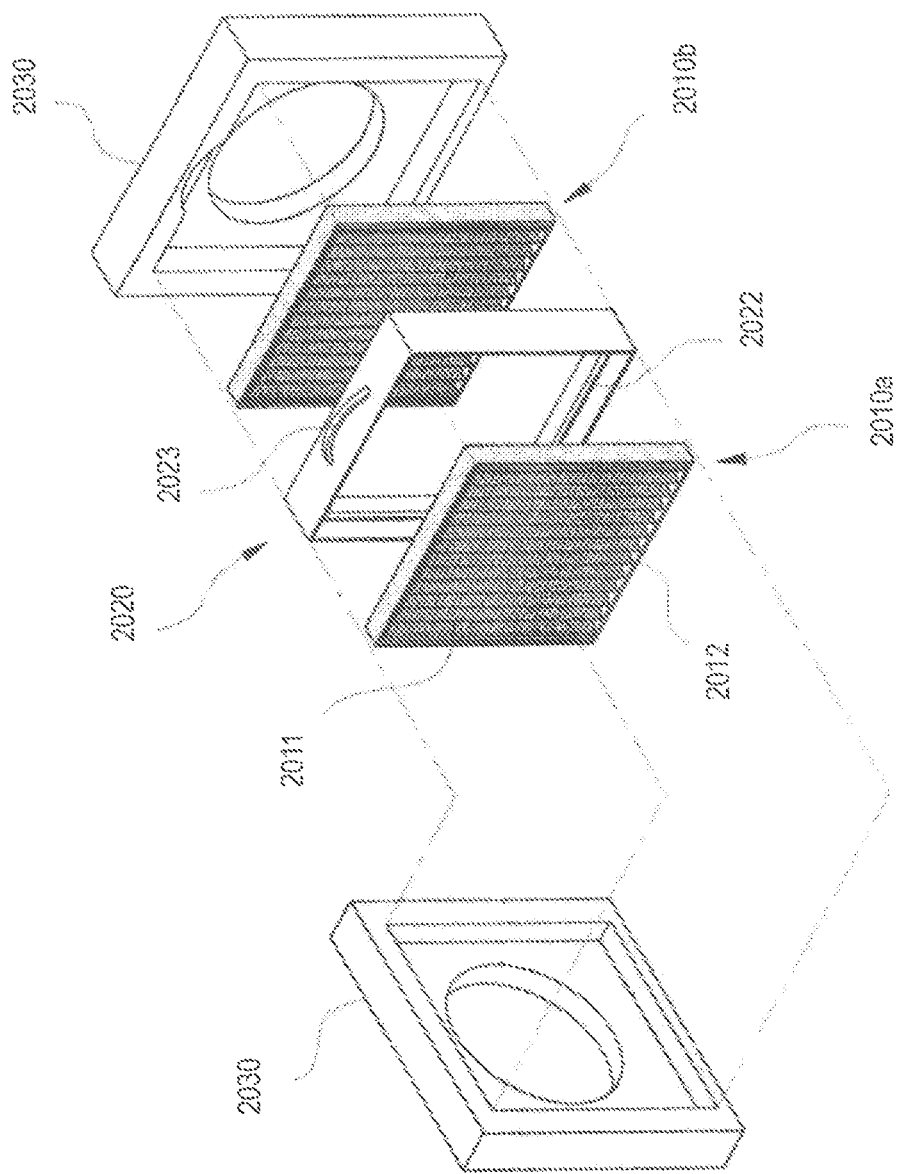
FIG. 20 is an exploded view of a conventional filter device.

An example filter device illustrated in FIG. 20, which prevents dew condensation in a heat exchanger system, is disclosed in KR 20170112964A. The filter device includes a filter element 2010a and 2010b, a cartridge 2020, a heat insulating material 2030 and a housing (not illustrated). The filter element 2010a, 2010b is mounted in the cartridge 2020, and the cartridge 2020 is further confined by a heat insulating plate 2030 which is embedded in a housing. A frame 2012 surrounds the filter body 2011. The outer wall of the frame 2012 is intimately connected to the inner wall 2022 of the cartridge 2020. The heat insulating plate 2030 is opened and closed to facilitate protection and exchange of the cartridge 2020. Dew condensation is prevented in a discharge pipe in the heat exchanger system by an arrangement of available pipes lines and the filter device which is installed at the discharge pipe. This arrangement has issues, including occurrence of a thermal breach and consequently condensation in the filter device, inconvenience of replacing the filter, and others.

Figure 21:
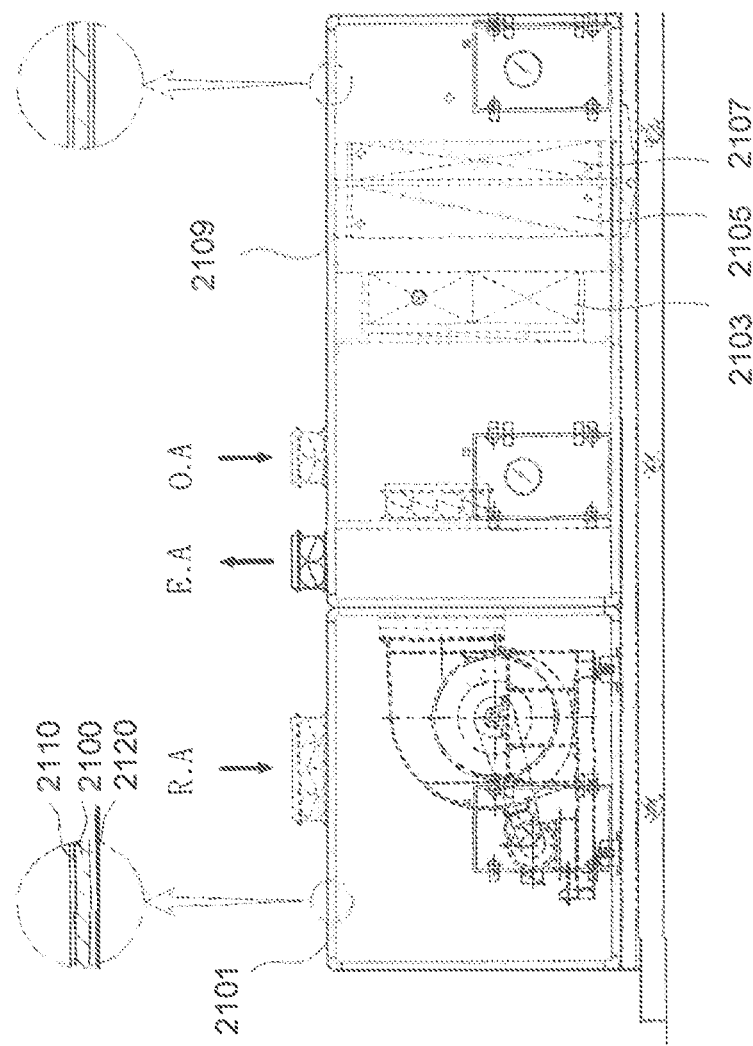
FIG. 21 is a conventional dew prevention air-conditioning system.

A dew prevention air-conditioning system illustrated in FIG. 21 is disclosed in KR 100906326B1. The system contains, among other things, a first case 2101 which is connected to a vent on the exterior side and houses a blower fan, a second case 2109 connected to the first case and to which air inlet and outlet parts are connected, and a third case (not illustrated) connected to the second case 2109. In the second case, a filter unit 2103, a heating coil 2105, and a cooling coil 2107 are arranged. Each of the first case 2101, second case 2109, and third case is composed of six panels making a cube, where each panel comprises an inner plate 2110 and an outer plate 2120. The inner and outer plates 2110, 2120 are filled with heat insulating material 2100 wherein the entire configuration of the air conditioning system as a whole attempts to prevent condensation from occurring within the air conditioning system itself. This does not address the issue at the filter box itself which is typically at an air inlet, nor is there any recognition of a thermal breach problem.

Figure 22:
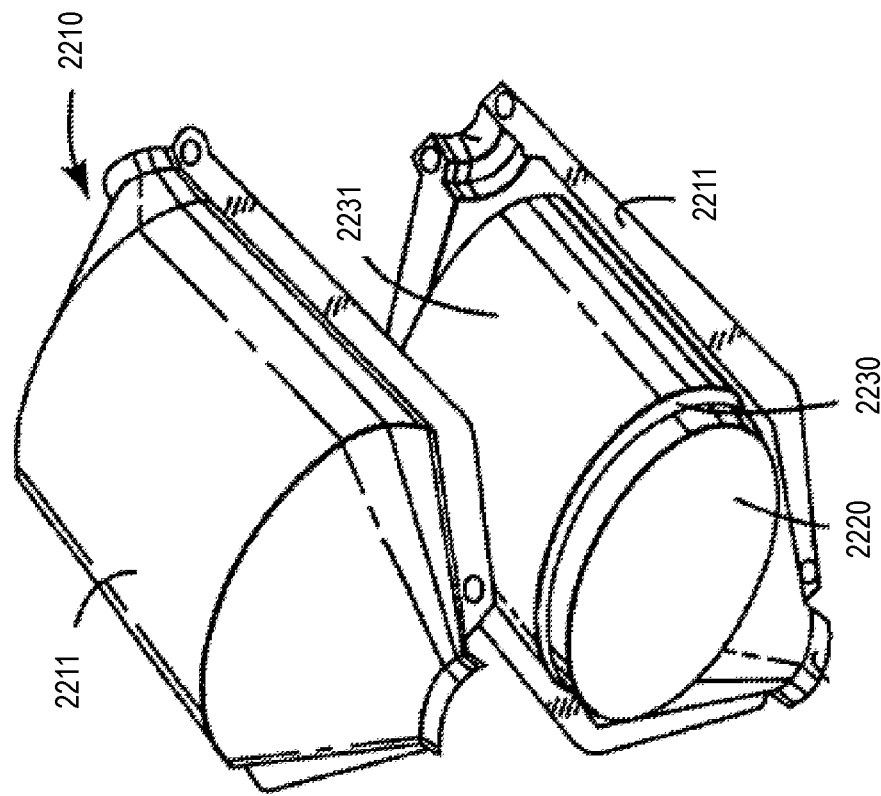
FIG. 22 is a conventional pollution control device.

A pollution control device, illustrated in FIG. 22, that prevents undesired flow of exhaust gas is disclosed in U.S. Pat. No. 7,524,546B2. The pollution control device includes a pollution control element, e.g., a filter element; the filter element is covered by an insulating material which is further confined by a metal casing. In particular, a catalytic converter 2210 is provided with a metal casing 2211, a monolithic solid catalyst element 2220 disposed in the metal casing 2211, and a thermal insulating material body 2230 disposed between the metal casing 2211 and the catalyst element 2220. The thermal insulating material body 2230 of inorganic fibers has a coating 2231. This fails to have any concept of (among other things) a possible thermal breach since there is no outer shell in this different configuration.

Accordingly, there remains a need for an insulated filter box which provides a structure so as to eliminate a thermal breach. There further is a need for such an insulated filter box which can be provided on a production basis rather than requiring the field-installation to install the insulation.

III. Insulated Filter Box

Further in accordance with exemplary embodiments introduced in FIG. 1 to FIG. 12, there is provided an insulated filter box that eliminates condensation which otherwise occurs in cold conditions. The inner shell is covered with insulation material which will keep the outer shell warm and reduce condensation which would otherwise occur due to the temperature difference between cold inside air inside the filter box and warmer outside air outside the filter box. In order to eliminate condensation, the present insulated filter box has a configuration which prevents thermal breaches between the inner shell and the outer shell. This means that there is no thermal contact between cold inside air inside the filter box and warmer outside air outside the filter box.

The inner shell and/or outer shell conveniently may be made of sheet metal, as one example. The filter may be confined inside the filter box, for example within an inner shell for holding the filter box;

In the following, the directions "front" and "rear" assume that the rear direction is downstream where air enters the air intake when the filter box is mounted thereon, and the front direction is upstream where the air enters the filter box when it is mounted on an air intake. The directions "left," "right", "top" and "bottom" are relative to the front-rear direction.

Figure 2:
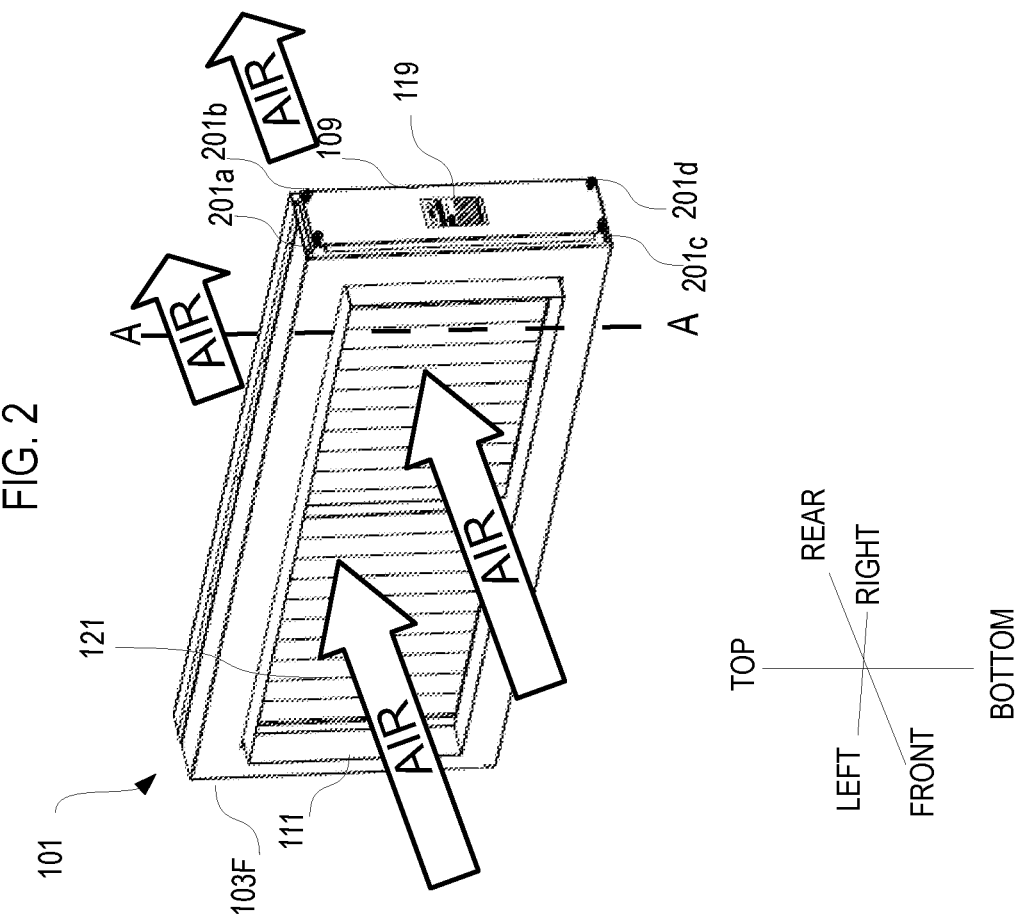
FIG. 2 is a front isometric view illustrating an assembled filter box with filter.

FIG. 1, FIG. 2 and FIG. 3 illustrate a filter box 101. FIG. 1 is an exploded view of the filter box 101 with an inner shell 105, outer shell 103, and filter 121. FIG. 2 and FIG. 3 are the front view and rear view, respectively, of the assembled filter box 101 with the inner shell 105, the outer shell 103, and the filter 121. These are now discussed in more detail.

FIG. 1 is an isometric exploded view illustrating a filter box 101 with filter 121. The filter box 101 includes an outer shell 103, here illustrated as a front outer half-shell 103F and a rear outer half-shell 103R. The filter box includes an inner shell 105. The inner shell 105 and outer shell 103 are separated from each other and spaced apart all over by an insulator (not illustrated in FIG. 1), which insulates and seals the inner shell from the outer shell. The insulator is discussed in more detail below, The front outer half-shell 103F and rear outer half-shell 103R are positioned together around the inner shell 105 which is insulated, and the front and rear outer half-shell 103F, 103R are fastened together, for example permanently, for example by a connector, as represented by fastening bracket(s) 107, and/or bolt(s), screw(s), rivet(s), or the like, and/or by welding and/or by adhering or the like. Once the front outer half-shell and the rear outer half-shell are combined, they should remain fixed and not disassembled.

The filter box 101 has a common access door through which a filter 121 is inserted through both the outer shell and the inner shell by sliding in a left-right direction, shown by arrow A into the filter box. The common access door includes a common access door 115 through the inner shell 105 and a common access door 117 through the outer shell 103 which define respective openings of about the same size which are aligned (and spaced apart by the insulator, illustrated in, e.g., FIG. 10) and slidably receiving the filter 121 therethrough. The opening which includes common access door 117 through the outer shell 103 is further defined by a front 117F and a rear 117R in the respective front outer half-shell 103F and rear outer half-shell 103R.

The filter 121 may be slidably removable and insertable through the common access door 115, 117, such as for easy maintenance and/or replacement. A door 109, discussed in more detail below, seals the common access door 115, 117.

On the door 109 may be attached a common access label 119 on which may be placed instructions and/or warnings as desired.

Air flows in the front-rear direction through the filter box 101 which is open in the front-rear direction, through the filter 121 which is received in the filter box 101 and confined in the inner shell 105, and then out through the rear of the filter box 101.

More particularly, at a front end of the inner shell 105 is disposed a flange 111 which is inserted through the front of the outer shell 103, where the front outer half-shell 103F is open. Consequently, air flowing in to an interior of the filter box 101 initially enters the filter box 101 through the flange 11 of the inner shell 105 and then in to the interior of the inner shell 105. Air flowing in to the interior of the filter box does not enter through the outer shell 103 and does not contact the outer shell 103. At a rear end of the inner shell 105 is disposed an adaptor 113 which is adapted to be mounted to and communicated with an air intake opening of an air handler. The adaptor 113 has an opening which is smaller than an opening at a rear of the outer shell 103. Because the adaptor 113 is mated to the air intake opening of the air handler, air that flows out of the interior of the filter box 101, that is, air flowing out of the interior of the inner shell 105, does not contact the outer shell 103 and flows directly from the interior of the inner shell 105 through the adaptor 113 and then to the air intake opening.

The outer shell 103 and inner shell 105 are each a rigid shell. The outer shell 103 and inner shell may be constructed of a rigid material, for example, sheet metal, such as galvanized steel, or plastic appropriately configured, or others, provided that the outer shell 103 and inner shell 105 are structurally sound and rigid so as to remain spaced apart from each other by the insulator with the insulator sandwiched therebetween.

In FIG. 1, illustrated from left to right in this order, are the front outer half-shell 103F, the inner shell 105, and the rear outer half-shell 103R. The inner shell 105 may be insulated with the insulator prior to assembly in the outer shell 103F, 103R. The insulator may be any insulation which can withstand the temperature difference, for example, duct board, rigid resin, bonded fibrous board, insulated foam, and the like. The material of the insulator with which the inner shell 105 is insulated is a heat insulating material, for example, a duct board, a rigid resin, a fibrous bonded board, insulated foam, or a combination thereof, or other insulation material. In an alternative embodiment, air in an air seal may be used as the insulator. The heat insulating material is selected to achieve the R value of the target temperature change, to withstand desired temperatures. As an example of selecting the heat insulating material, a 1 inch duct board may be conveniently used as the insulating material when the target operating temperature of this filter box is, for example, 14° F. to 68° F. Thermal calculations may be used to arrive at 1 inch duct board (the R-value of commercially available insulations, e.g., 1 inch duct board, at temperature (s) is generally known); the duct board thickness is 1 inch which is dependent on the target R value.

The filter 121 may be a typical filter, e.g., pleated, MERV, HEPA, electrostatic, or other appropriate materials, and evolutions thereof. Filter 121 as illustrated represents one or more filters which may be used. The size of the filter 121 is dependent on the size of the opening of the air handler to which it is fitted. For example, the filter 121 may be 16×24×2".

The size of the flange 111 may be adapted to the size of the opening of the air intake to the air handler. The size of the adaptor 113 may be matched to the size of the opening of the air intake of the air handler. Different size openings of different air handlers may have different size filters and consequently filter boxes 101 which are manufactured may have different sizes as appropriate to the respective air handler on which each filter box will be used.

The filter box 101 with this configuration can withstand some very different hot and cold temperatures without condensating. The illustrated filter box 101 can operate, for example, in extreme cold and extreme heat (going from cold to hot, e.g., 80 degrees or more) without condensating. Cold refers to the cold air coming in to the inner shell 105 and hot is the hot air on the exterior of the outer shell 103. By comparison, a conventional filter box would have thermal breaches in many situations, for example where the shell cooled by air coming in is exposed to warmer conditions outside the shell. As will be further discussed, the filter box 101 does not have a thermal breach between the outer shell 103 and the inner shell 105.

Once the inner shell 105 is assembled as illustrated in FIG. 4, the insulator may be installed around the inner shell 105. Alternatively, the insulator may be installed on the interior of the outer shell 103. The front outer shell 103F and rear outer shell 103R are installed around the inner shell 105. In particular, the parts of the outer shell are connected together after the inner shell is inside of the outer shell. In another alternative, the insulator which may be, e.g., insulated foam or similar may be filled into a space between the outer shell 103 and inner shell 105 after the inner shell 105 is contained in the outer shell 103.

FIG. 2 is a front isometric view illustrating the filter box 101, which is assembled, with the filter 121 confined in the inner shell 105. FIG. 3 is a rear isometric view illustrating the assembled filter box with the filter 121.

The assembled filter box 101 may be provided with the door 109 on at least one side, e.g., left, right, top or bottom side, for replacement of the filter 121. The filter 121 may be slidably replaced through the door 109 when in an open position. The illustrated door 109 may be constructed as an access panel which is affixed to the outer shell 103 in a manner which allows the door to be opened and closed. The illustrated door 109 has removable door fastener 201, for example, corresponding to corners or sides of the door 109, such as one or more thumb screws represented here by four thumb screws 201a, b, c, d; the door fastener 201 may be other attachments between the door 109 and the filter box 101, for example the door 109 may swing about a hinge, pivot about a pivot, clip to the filter box 101, attach by a spring, and/or be fastened by one or more removable fasteners or the like, for example at one or more corners or one or more sides of the door 109, to permit opening or removal or the like of the door 109 so as to provide access to insert and/or remove the filter 109. The door fastener 201 may be loosened to remove the door 109 and then the filter 121 may be removed by sliding out through the common access door. A filter 121, such as a replacement filter, may be inserted by reversing the process, that is, by sliding through the common access door, and then fastening the door 109 across the common access door. In this way, it is unnecessary to remove the outer shell 103 and/or the inner shell 105 to observe, maintain, replace, or remove the filter 121. That is, the filter 121 slides in through the common access door, which has an opening to the interior of the inner shell 105 under the door 109.

The door 109 and corresponding common access door 115, 117 may be positioned alternatively a different side/top-bottom. For use with a ceiling mount air handler, as an example, it is convenient for the filter box 101 to have the door 109 on the right side or left side.

As illustrated in FIG. 2, air shown by the arrows flows in to the filter box 101 through the flange 111 and then to the interior of the inner shell 105 in which the filter 121 is confined. As illustrated in FIG. 3, air which is in the interior of the inner shell 105 flows through the filter 121 and then out through the adaptor 113.

FIG. 4, FIG. 5, FIG. 6 and FIG. 7 illustrate various features of the inner shell 105. FIG. 4 is an exploded view of the inner shell. FIG. 5 and FIG. 6 are the front view and rear view, respectively, of the assembled inner shell. FIG. 7 illustrates an adaptor exploded from the inner shell. These figures are now discussed in more detail.

FIG. 4 is a front isometric exploded view illustrating the inner shell 105, showing gasketing and riveting together. The inner shell includes a flange 111. The flange 111 may include a flange top 111T, a flange bottom 111B, a flange left 111L, and a flange right 111R. The flange 111 may conveniently be constructed of the same material as the inner shell 105.

The inner shell 105 may include inner shell sides 401 including inner shell top 401T, inner shell left 401L, inner shell right 401R, and inner shell bottom 401B. The inner shell sides 401 may be constructed of the material of the inner shell as discussed above. The inner shell may include an inner shell front face 403, including inner shell front face top 403T, inner shell front face right 403R, inner shell front face left 403L, and inner shell front face bottom 403B.

The adaptor 113 may be connected to the inner shell 105. A filter gasket 405 may be sandwiched between the adaptor 113 and the inner shell 105. The filter gasket 405 seals the airflow channel of the inner shell to the adaptor 113. A unit gasket 407 may be disposed on a rear of the adaptor 113 so as to be sandwiched between the adaptor 113 and an air handler on which the adaptor 113 is mounted. The unit gasket 407 seals the adaptor to the air intake opening.

In this illustration, rivets are used as fasteners between the sheet metal parts. Other fasteners may be used to make a permanent connection as appreciated by one of skill in the art, for example, welding, adhering, spot welds, screws, nails, could be pressed into shape, extruded out of plastic. The inner shell is assumed to be permanently assembled.

In this illustration, the filter gasket 405 and the unit gasket 407 are provided for the purpose of air sealing around the airflow channel. These may increase the insulation factor and dampen any noise. The unit gasket 407 on the rear of the adaptor 113 forms a seal when mounted up against the air handler.

In the illustration, the filter gasket 405 and unit gasket 407 are provided on each side of the adaptor 113. Either or both gaskets could be omitted, but an air leak is less likely when both gaskets are included. The filter gasket 405 fills the gap between the filter box 101 and the side wall of the outer shell 103, thereby to reduce the air leaks. The filter gasket 405 causes the air to follow a desired path; without the filter gasket 405 some air might flow under the filter 121; this would cause a loss of performance.

The gaskets 405, 407 may be formed of an insulated material, such as a rubber or foam, e.g., a sealing form, e.g., a sponge rubber form, such as EPDM ("ethylene propylene diene monomer") foam, or the like. The inner shell 105, filter gasket 405, adaptor 113, and unit gasket 407 may be assembled in this order.

The adaptor 113 and unit gasket 407 may have a hole pattern for connectors (for example, mounting screws) that matches a predetermined hole pattern on the air handler, that is, the unit to which the adaptor mounts. The adaptor 113 positions the airflow channel of the inner shell to the air intake opening. The purpose of the adaptor 113 is to space the filter box 101 away from the air handling unit; more particularly, the purpose of the adaptor 113 is to position the filter box 101 (and consequently the airflow channel with filter therein) in relation to the air intake opening of the air handler on which the filter box 101 is to be mounted. The adaptor 113 is intended for a close mechanical fit to the unit. The shape of the adaptor 113 is adapted to the shape of the air intake of the unit on which the adaptor is intended to be mounted. The adaptor 113 may be a different shape depending on the shape of the air handler on which it will be used.

One or both of the gaskets 405, 407 may be adhered to the adaptor 113 by an adhesive, e.g., adhesive glue, adhesive tape, and/or pressure sensitive adhesive provided on at least one side of the gasket material.

To retain the filter 121, the interior of the inner shell 105 may include a filter track which can include one or more of a filter track top right 409TR, a filter track top left 409TL, and/or a filter track bottom 409B. The filter track 409TR, 409TL, 409B acts as a platform which provides more precise positioning of the filter installed in the inner shell 105 in the top-bottom direction and/or left-right direction, to thereby confine the filter 121 in the filter box 101.

FIG. 5 is a front isometric view illustrating an assembled inner shell, and FIG. 6 is a rear isometric view illustrating an assembled inner shell. As further illustrated in FIG. 5 and FIG. 6, an airflow channel 411 is defined by top, left, right, and bottom sides of the inner shell 105, as shown in FIG. 6, the adaptor 113 may be affixed, permanently, to an inner shell rear face 601. Air, shown by the arrows, flows in from the flange 111 at the front of the airflow channel 411 to the interior of the inner shell 105 and then out from the interior of the inner shell 105 through the adaptor 113. The flange 111 protrudes frontward as the upstream end of the air channel which is also the upstream end of the filter box, and the adaptor 113 protrudes rearward as the downstream end of the air channel which is also the downstream end of the filter box. Consequently, air in the airflow channel 411 does not contact the outer shell 103, from the upstream where the air enters the filter box 101 to the downstream where the air exits the filter box 101.

The common access door 115 through the inner shell 105 must be sufficient for the filter 121 to slide in, e.g., at least a littler larger than the height in the top-bottom direction and width in the front-rear direction of the filter.

In the illustration, notches on parts of the inner shell 105 may be used for an assembler that is assembling the inner shell 105 to orient top vs. bottom.

FIG. 7 is an isometric view illustrating an adaptor 113 exploded from an inner shell 105. The adaptor 113 includes an adaptor attachment lip 701 at the front of the adaptor and an adaptor attachment plate 703 at the rear of the adaptor 113. The adaptor attachment lip 701 is mounted to the upstream side of the inner shell 105 to thereby attach the adaptor 113 to the inner shell 105. The adaptor attachment plate 703 is mounted to the downstream wide of the inner shell 105 to thereby mount the adaptor 113 to the air handler.

The adaptor attachment lip includes adaptor attachment lip top 701T, adaptor attachment lip bottom 701B, adaptor attachment lip left 701L, and adaptor attachment lip right 701R. The adaptor attachment plate 703 includes adaptor attachment plate top 703T, adaptor attachment plate bottom 703B, adaptor attachment plate left 703L, and adaptor attachment plate right 703R.

The door is illustrated in an isometric exploded view of FIG. 8 and an assembled view in FIG. 9. The door 109 includes a door face 801, a door insulator 803, a door seal plate 805, and a door gasket 807, in this order. The door insulator 803 is made of a heat insulating material, described for example above. The door face 801 and the door seal plate 805 may be made of a rigid material, described for example above. The door insulator 803 is sandwiched between the door face 801 and the door seal plate 805, so that there is no contact between the door face 801 and the door seal plate 805, that is, there is no thermal breach between the door face 801 and the door seal plate 805. When the door 109 on the filter box 101 is in a closed position, the door gasket 807 is sealed to the outer shell 103 against the common access door 115, 117 which reduces or eliminates air leakage around the door 109.

An assembled door 901 ready for installation on the filter box is illustrated in the isometric view of FIG. 9. The assembled door 901 may include door fastener receiver(s), here represented by four holes 903a, 903b, 903c, 903d at each of the respective corners of the assembled door 901 which is removably fastened to the outer shell, for example, utilizing thumb screws or other fasteners as was discussed above. Accordingly, there is provided heat insulation between the contact of the right side of the outer shell and the door assembly 901 to avoid condensate.

Figure 10:
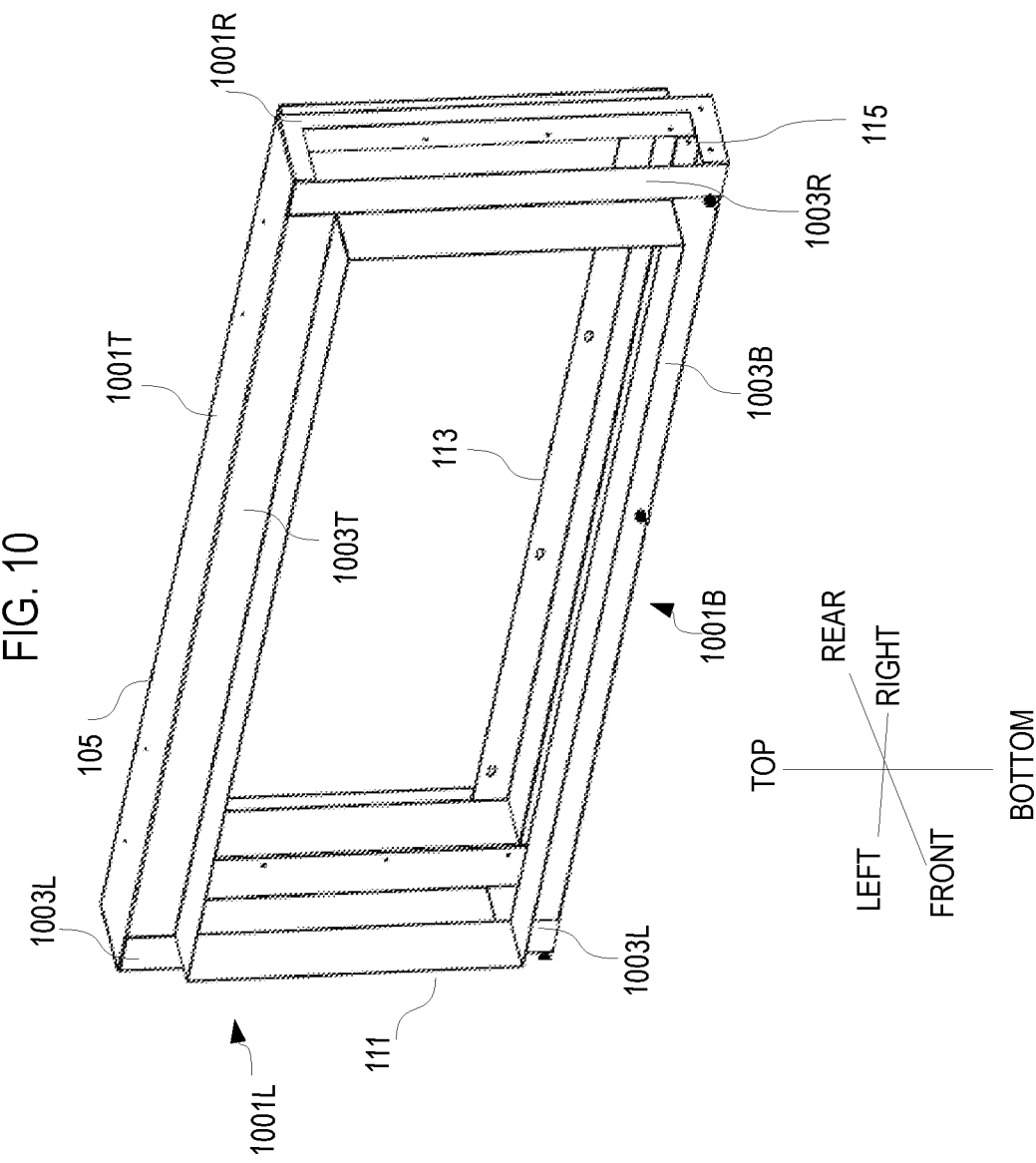
FIG. 10 is an isometric front view illustrating an insulator on an inner shell.
Figure 12:
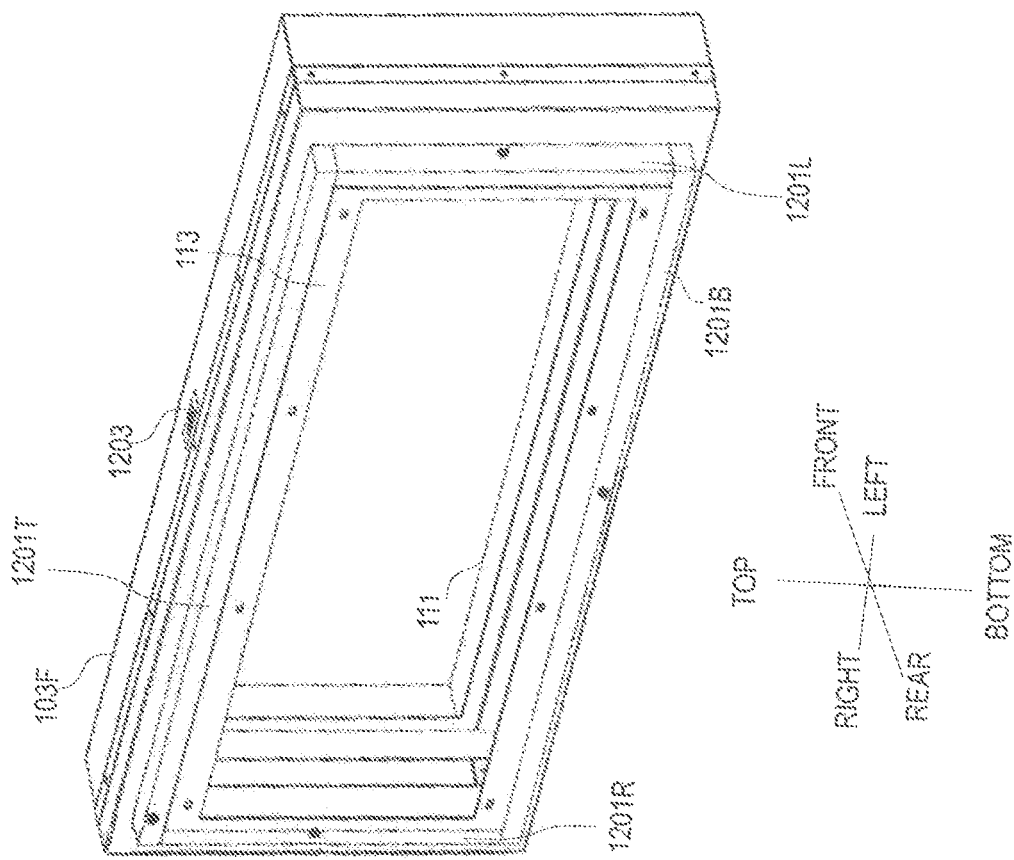
FIG. 12 is an isometric rear view illustrating an insulator, an adaptor and an inner shell in a front outer shell-half.
Figure 11:
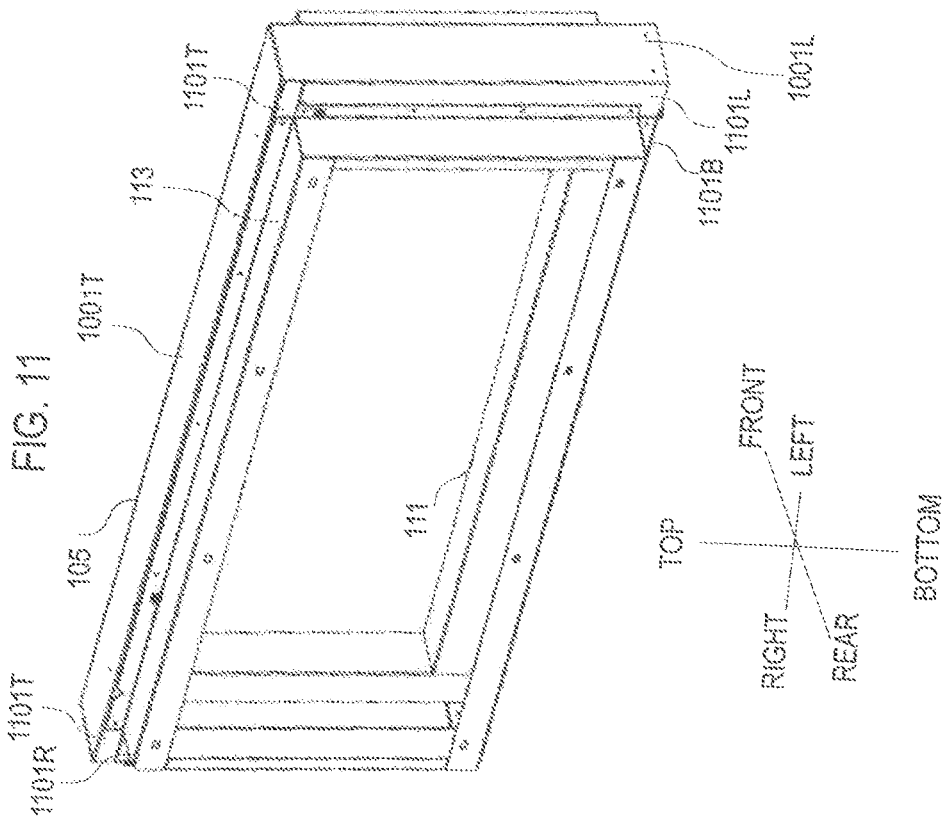
FIG. 11 is an isometric rear view illustrating an insulator on an inner shell.

FIG. 10, FIG. 11 and FIG. 12 provide illustrations of installing insulator on the inner shell 105, and show insulator on front, first phase installation on rear, and fully insulated, respectively. This illustrates where to position pieces of the insulation (for example, 1 inch duct board). The duct board may be adhered to the inner shell 105. Other types of insulation may be used, e.g., foam, and others considered herein. The duct board has an adhesive on it and readily adheres to the inner shell 105. When the front outer half-shell and rear outer half-shell are assembled together around the insulated inner shell 105 as described above, there is a slight compression of the insulation material, so that the inner shell 105 seats nicely into the front and rear outer half-shells during assembly, and may guarantee a seal. Accordingly, the front outer half-shell 103F and the rear outer half-shell 103R may be fastened together around the insulated inner shell 105, and the insulator is compressed between the outer shell and the inner shell.

As long as the inner shell 105 is insulated, there could be a gap between pieces of the insulation and not affect the performance, because the reduced or eliminated condensate relates to the avoidance of all thermal breaches between the outer shell 103 and the inner shell 105. Thermal calculations were used to arrive at 1 inch duct board (the R-value of commercially available insulations, e.g., 1 inch duct board, at temperature(s) is generally known). This material is 1 inch depending on the target R value.

The insulation material may be, for example, duct board, but may be a different material, e.g., foam material, as discussed above, to avoid condensate at the operating temperatures.

FIG. 10 is an isometric front view illustrating sides insulator 1001 and front face insulator 1003 on an inner shell 105. The sides insulator 1001 includes insulator top side 1001T, insulator bottom side 1001B, insulator left side 1001L, and insulator right side 1001L, which entirely cover the inner shell 105 on its top, bottom, left, and right sides. Note that the insulator right side 1001L has an opening corresponding to the common access door 115 through the inner shell 105. The front face insulator 1003 includes insulator front face top 1003T, insulator front face bottom 1003B, insulator left face 1003L, and insulator right face 1003R, which entirely cover the inner shell 105 on top, bottom, left, and right of its front facing side. It is not necessary to insulate the flange 111.

FIG. 11 is an isometric rear view illustrating a rear face insulator 1101 on an inner shell 105. The rear face insulator 1101 includes insulator rear face top 1101T, insulator rear face bottom 1101B, insulator rear face left 1101L and insulator rear face right 1101R, which entirely cover the inner shell 105 on its top, bottom, left and right of its rear face.

Once the inner shell 105 is fully insulated on its front face and sides and may be seated with a slight compression into the front outer half-shell 103F, so that the sides insulator 1001 and front face insulator 1003 are sandwiched between the inner shell 105 and the front outer half-shell 103F; the inner shell 105 and front outer half-shell 103F do not directly contact each other.

FIG. 12 is an isometric rear view illustrating an adaptor insulator 1201 and an adaptor 113 on an inner shell in a front outer half-shell 103F. The adaptor insulator 1201 includes adaptor insulator top 1201T, adaptor insulator bottom 1201B, adaptor insulator left 1201L, and adaptor insulator right 1201R. An optional top label 1203 may be included on top of the front outer half-shell 103F.

Once the inner shell 105 is fully insulated on its rear face and around the adaptor 113, the inner shell 105 may be seated with a slight compression into the rear outer half-shell, so that the sides insulator 1001 and rear face insulator 1201 are sandwiched between the inner shell 105 and the rear outer half-shell; the inner shell 105 and the rear outer half-shell do not directly contact each other. The front outer half-shell and rear outer half-shell may be affixed together around the insulated inner shell. This forms the filter box, with the insulator compressed between the outer shell and the inner shell, and the insulator seals the inner shell from the outer shell.

Figure 13:
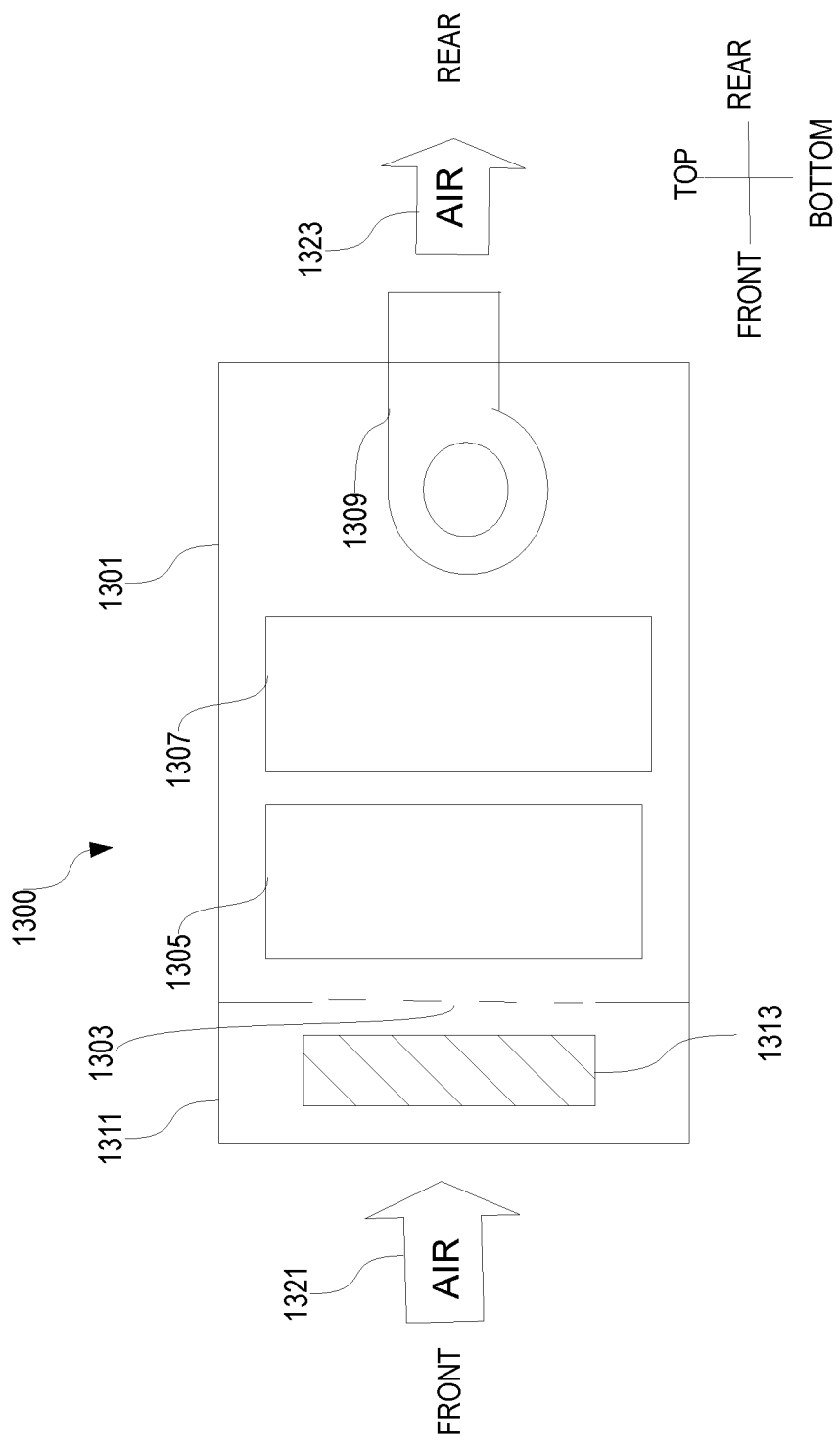
FIG. 13 is a block diagram illustrating a simplified air conditioning apparatus.
Figure 14:
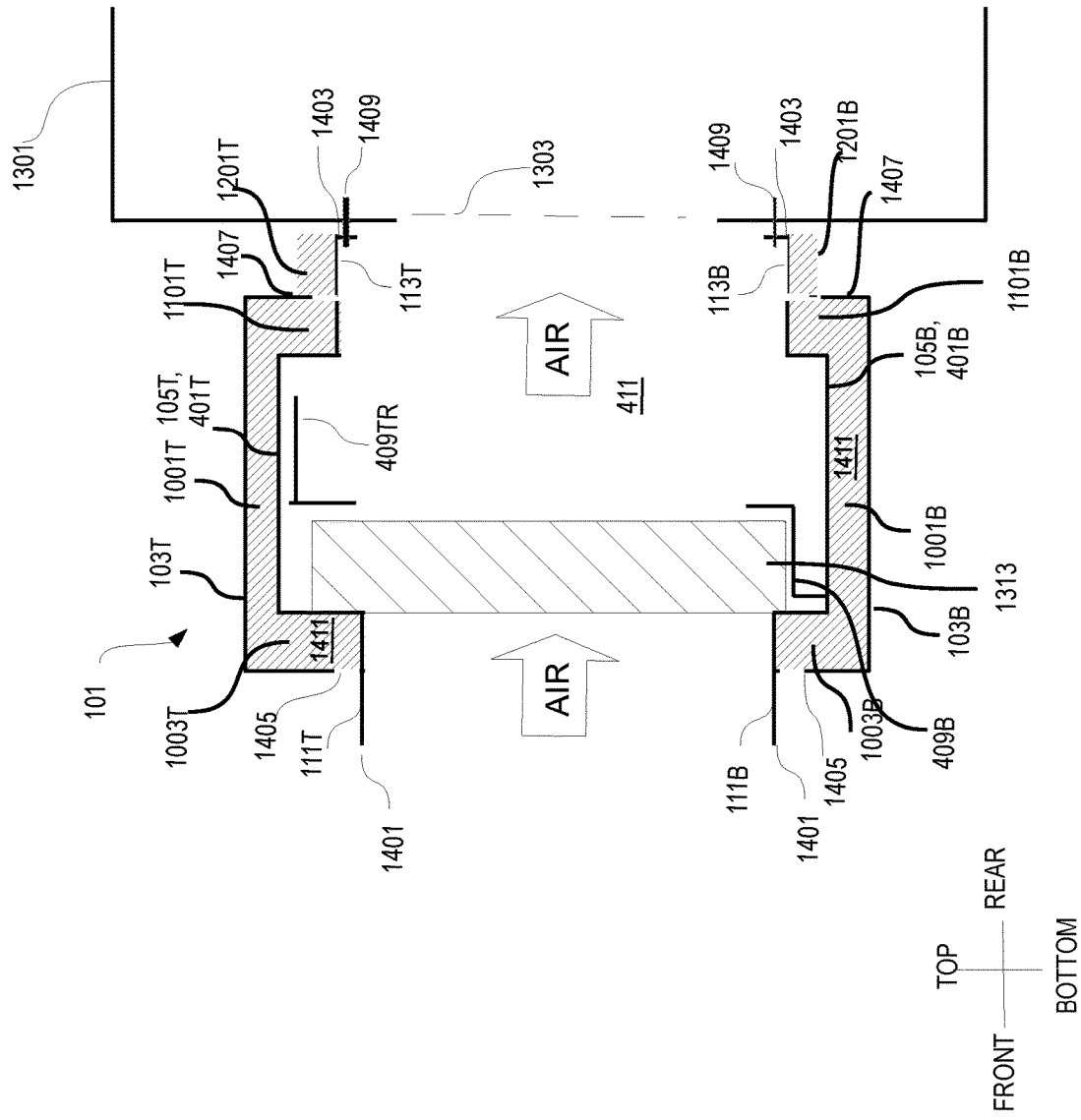
FIG. 14 is simplified cross section view illustrating an assembled filter box at A-A of FIG. 2.

The filter box mounted on an air intake opening of an air handler is discussed in connection with the representative diagrams of the air conditioning system (FIG. 13), and a closeup cross section of the mounted filter box (FIG. 14).

FIG. 1 to FIG. 12 and FIG. 15 to FIG. 19 are to scale. FIG. 13 and FIG. 14 are not to scale.

FIG. 13 is a block diagram illustrating a simplified representative air conditioning apparatus 1300. The air conditioning apparatus 1300 is representative of different varieties. The air conditioning apparatus 1300 may include at least an air handler 1301 and a filter box 1311. The air handler may include an air intake opening 1303 (illustrated as broken lines). The air conditioning apparatus may include other operational parts, which may include a heating coil 1305, a cooling coil 1307, and a supply fan 1309; these are well understood to those of skill and are not further described herein. The filter box 1311, described herein in detail, is mounted to the air intake opening 1303 of the air handler 1301. A filter 1313 is confined in the filter box in the airflow channel. Intake air 1321 flows in from an opening in the front side of the filter box 1311, through the filter box 1311 and the filter 1313, then through the air intake opening 1303, through the air handler 1301 and then supply air 1323 flows out of the air handler 1301.

When the air handler 1301 is operated, air 1321 is forced into the filter box 1311 through the filter 1313 confined in the airflow channel, and through the air handler 1301, and then air is blown out as, for example, supply air 1323.

FIG. 14 is simplified cross section view illustrating an assembled filter box 101 at sectional line A-A of FIG. 2, as mounted on the air handler 1301. FIG. 14 illustrates the inner shell 105, outer shell 103, flange 111, and adaptor 113. The filter 1313 is illustrated with large hatching. The insulator is illustrated with small hatching.

The airflow channel 411 communicates from a front end opening 1401 of the inner shell 105 through the filter 1313 (which is confined in the filter box 101) to a rear end opening 1403 of the inner shell. The front end opening 1401 corresponds to the upstream end of the flange 111, and the rear end opening 1403 corresponds to the downstream end of the adaptor 113. The outer shell 103 has a front end opening 1405 and a rear end opening 1407, and the outer shell 103 defines a chamber 1411 from the front end opening of the outer shell to the rear end opening 1407 of the outer shell.

The outer shell 103 contains the inner shell 105 in the chamber 1411 and the insulator 1001, 1003, 1101, 1201 is sandwiched between the outer shell 103 and the inner shell 105. The inner shell 105 and the outer shell 103 are separated and spaced apart all over by the insulator which insulates and seals the inner shell from the outer shell. The outer shell 103 and the inner shell 105 do not directly contact each other at any point.

The flange 111 protrudes the airflow channel 411 to the front upstream beyond outside the outer shell 103; and the flange 111 protrudes beyond the front end opening 1405 of the outer shell. The outer shell 103 does not come into contact with the inner shell 105. Specifically, the outer shell 103 does not come into contact with the flange 111.

The adaptor 113 protrudes the airflow channel 411 to the rear downstream beyond the outer shell 103; and the adaptor 113 protrudes beyond the rear end opening 1407 of the outer shell. The adaptor 113 can be mounted to the air handler to mate to the intake opening 1303 using mounting fasteners 1409.

Figure 15A:
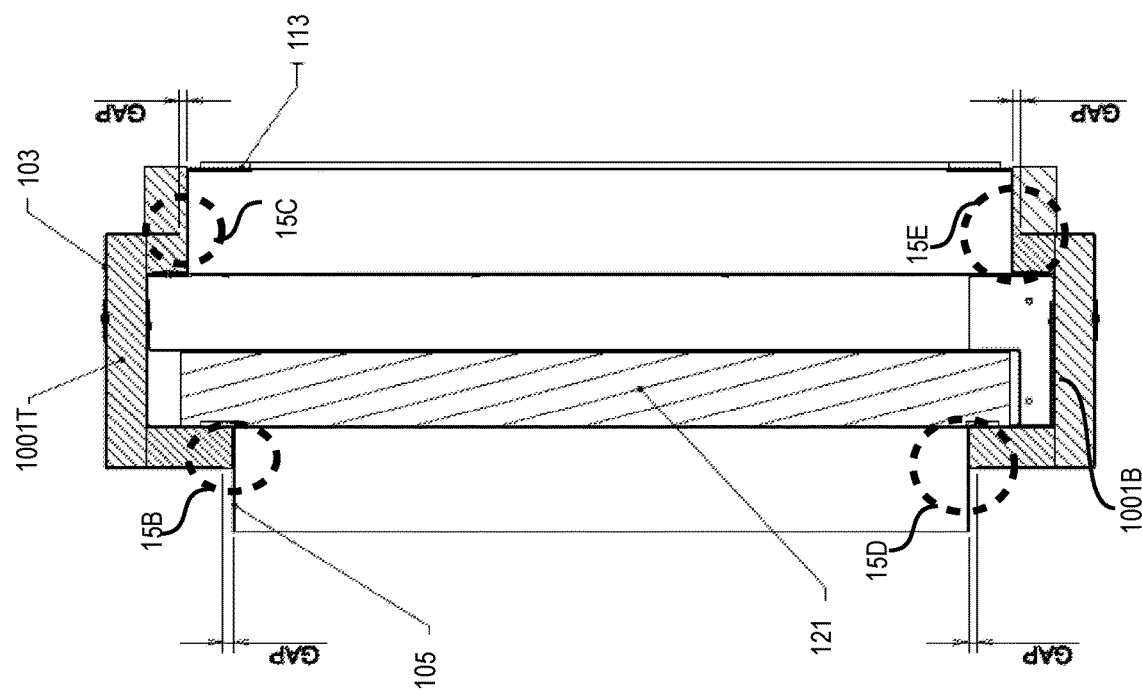
FIG. 15A is a cross section view of filter box at A-A of FIG. 2.

FIG. 15A is a cross section view of the filter box, and FIG. 15B to FIG. 15E are closeups, for further discussion of a configuration which prevents the thermal breach. FIG. 15A is a cross section of filter box at A-A of FIG. 2 (to scale). FIG. 15B to FIG. 15E are closeups of FIG. 15A illustrating a gap between an inner shell and an outer shell.

FIG. 15A is a cross section view of the filter box 101, which is assembled as a unit, and the closeups of FIG. 15B to FIG. 15E, further detail how the inner shell 105 and outer shell 103 interact with each other so that there is no thermal breach. The filter 121 is illustrated with large hatching, and the insulator 1001 is illustrated with small and medium hatching.

Figure 15C:
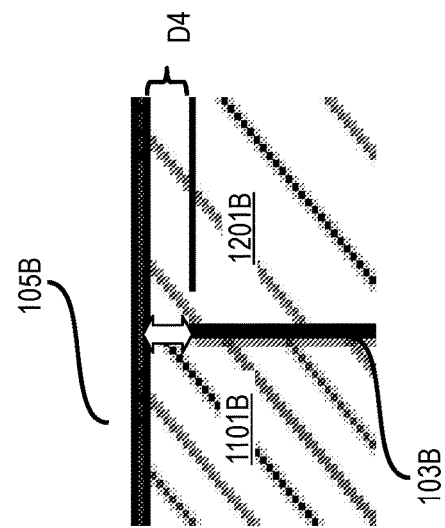
FIG. 15B to FIG. 15E are closeups of FIG. 15A illustrating a gap between an inner shell and an outer shell.
Figure 15E:
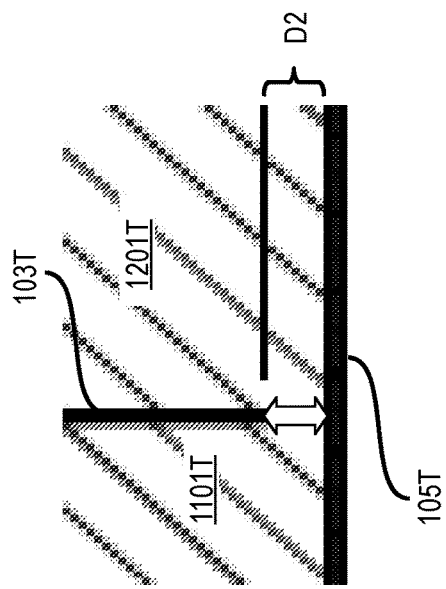
Figure 15B:
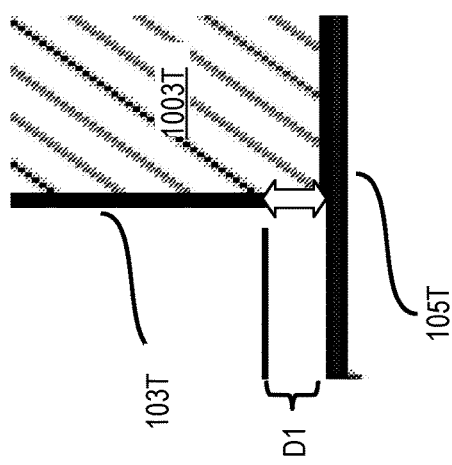
Figure 15D:
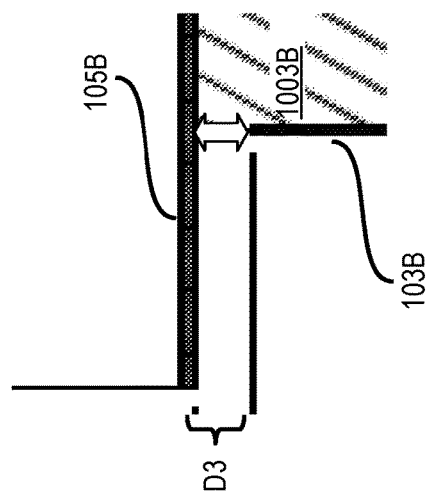

At each of the closeups of FIG. 15B to FIG. 15D there is a gap between the inner shell 105 and the outer shell 103. Referring now to FIG. 15B, at the top front of the filter box, there is a gap of distance D1 between outer shell top 103T and inner shell top 105T. Referring now to FIG. 15C, at the top rear of the filter box, there is a gap of distance D2 between outer shell top 103T and inner shell top 105T. Referring to FIG. 13D, at the bottom front of the filter box, there is a gap of distance D3 between outer shell bottom 103B and inner shell bottom 105B. Referring to FIG. 13E, at the bottom rear of the filter box, there is a gap of distance D4 between outer shell bottom 103B and inner shell bottom 105B. In the gaps between the inner shell 105 and the outer shell 103 is the insulator. In the present example, the distances D1 to D4 may be the same, although the distances D1 to D4 may differ.

Due to the gap of distances D1, D2, D3 and D4, and the insulator rear face 1101 and the front face insulator 1003 which maintain the gap, the insulated filter box 101 does not have a thermal breach. In particular, there is a gap between the inner shell 105 and the outer shell 103 which do not directly contact each other at all. Sandwiched between the inner shell 105 and the outer shell 103 is the insulator 1003.

Figure 19:
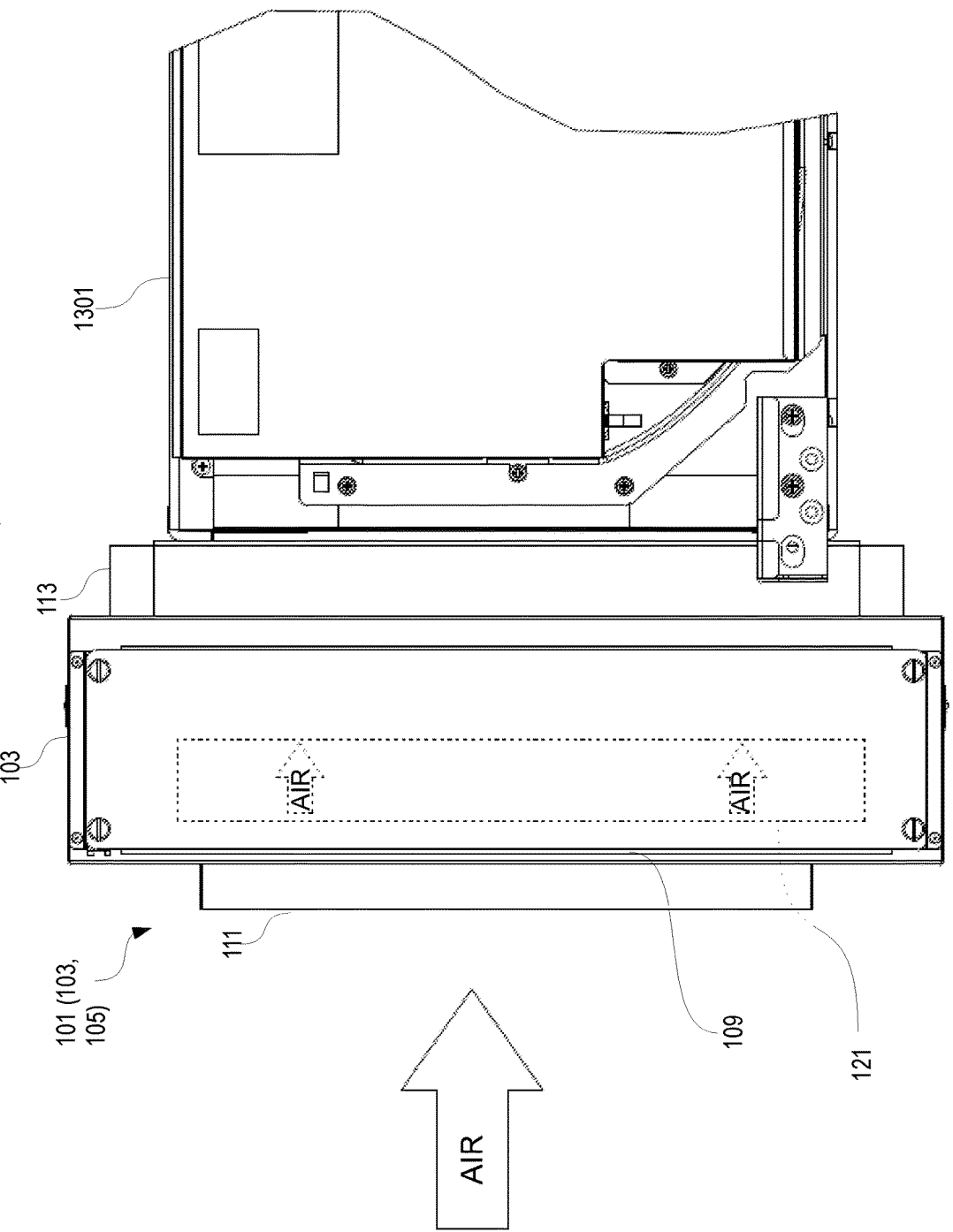
FIG. 19 is a side view illustrating an air conditioning apparatus.

FIG. 16, FIG. 17A to FIG. 17D, FIG. 18 and FIG. 19 illustrate the filter box 101 which is ready for installing by an installer in the field. FIG. 16 illustrates the filter box 101 with the door 109 temporarily removed and the filter 121 (here represented by two filters 121a, 121b; more or fewer filters may be provided) pulled away. FIG. 17A to FIG. 17D illustrate isometric, top, front, and side view of the filter box with filter confined therein. FIG. 18 illustrates the filter box in relation to the air handler of an air conditioning apparatus. FIG. 19 is a side view of the filter box illustrating the air conditioning apparatus in operation with the filter box.

FIG. 16 is an isometric front view illustrating an assembled filter box 101 with a filter for insertion. The filter box 101 has been assembled and insulated, for example as discussed above, from an inner shell 105 and an outer shell 103, and includes the adaptor 113 as discussed above in detail. FIG. 16 illustrates the door 109 in an open position to replace the filter 121a, 121b which has been slidably removed via the common access door 115, 117.

FIG. 17A is an front isometric view illustrating the assembled filter box 101 which is assembled from the filter box 101, filter 121a, b and door 109 of FIG. 16, as described in more detail above. Also illustrated are the filter(s) 121a. 121b which is confined in the filter box 101, and the door 109 in a closed position. FIG. 17B is a top view illustrating the assembled filter box 101. FIG. 17C is a front view illustrating the assembled filter box 101 and the filter(s) 121a, 121b. FIG. 17D is a right side view illustrating the assembled filter box with the door 109 in the closed position.

FIG. 18 is an isometric exploded view illustrating an air conditioning apparatus 1300. The filter box 101 is installed on a representative air handler 1301, which is representative of any air handler. This configuration can be applied to filter boxes which are adapted as appropriate in size and shape for other types of air handlers which may have other types of filters.

One way in which the present filter box is different from conventional filter boxes is because the present filter box has a delta from a very cold to very hot temperature and the filter box does not experience condensation due to the lack of thermal breach. The airflow is from front to rear as shown by the directional arrows. As illustrated in FIG. 18, the entering air temperature which enters the filter box 101 may range from 14° F. to 68° F.

IV. Method of Insulating a Filter Box, and Operating an Air Conditioning Apparatus with Insulated Filter Box Further in accordance with exemplary embodiments is provided a method for insulating a filter box to prevent condensation in cold conditions, and is illustrated for example in FIG. 10, FIG. 11, FIG. 12, FIG. 14, FIG. 16, FIG. 18 and FIG. 19.

As illustrated in FIG. 10, an inner shell 105 is provided, which defines an airflow channel as discussed above from a front end opening of the inner shell through the one or more filters to a rear end opening of the inner shell. The inner shell is adapted to confine one or more filters therein, as further discussed above. The inner shell further may include an adaptor 113. The inner shell further may include one or more gaskets sandwiched between the adaptor and the inner shell, and/or on the adaptor to be sandwiched between an air handler, for example to increase the thermal insulation. Accordingly, there is provided the inner shell adapted to confine at least one filter therein, the inner shell defining an airflow channel from a front end opening of the inner shell through the at least one filter to a rear end opening of the inner shell.

An adaptor 113, and/or a filter gasket and/or a unit gasket may be provided. The filter gasket may be assembled on the rear end opening of the inner shell 105, the adaptor 113 may assembled on the filter gasket, and the unit gasket may be assembled on the adaptor 113. It will be appreciated that one or more of the gaskets may be omitted with some loss of air from the airflow channel. It will be appreciated that additional gaskets may be utilized. It may be convenient to assemble the filter gasket, adaptor 113 and unit gasket on the inner shell 105 prior to applying the insulation and/or prior to disposing the inner shell into the outer shell 103.

As illustrated in FIG. 10, the inner shell 105 may include a flange 111 protruding forward at the front end opening of the inner shell 105. The flange 111 has been discussed in more detail above.

As illustrated for example in FIG. 11 to FIG. 12, the inner shell 105 is covered all around at sides, front, rear, top, and bottom, by an insulator which includes a heat insulating material. In this illustration, the insulator is disposed on the outer periphery of the inner shell, including the rear, top, bottom, left, and right sides of the inner shell, and the front up to the flange 1401. As illustrated in FIG. 12, the insulator is sandwiched between the inner shell 105 and the outer shell 103. In FIG. 12, the front side of the insulated inner shell 105 is disposed into the front outer half-shell 103F and the insulation may be compressed between the front outer half shell 103F and the inner shell 105. The rear side of the insulated inner shell 105 is disposed into the rear outer half shell and may be compressed therebetween. It will be appreciated that the outer half shells, which are illustrated as "front" and "rear", may alternatively be "top" and "bottom", "left" and "right", or similar. It will be appreciated that the outer half shells are representative of two or more partial shells, which collectively are installed around the inner shell to form the outer shell. It will be appreciated in some embodiments that the insulator may be first disposed on the outer shell and then disposed on the inner shell when the outer shell is installed around the inner shell, and vice-versa. It will be appreciated in some embodiments that the outer shell is installed around the inner shell and that the insulator is disposed on the inner shell by being filled into the chamber created between the interior of the outer shell and the exterior of the inner shell.

Accordingly, an insulator may be disposed on the inner shell. Accordingly, a front outer half-shell and a rear outer half-shell are installed around the inner shell, to form an outer shell that defines a chamber from a front end opening of the outer shell to a rear end opening of the outer shell, and the outer shell contains the inner shell, which is insulated, in the chamber and the insulator is sandwiched between the outer shell and the inner shell, the inner shell and the outer shell are separated and spaced apart all over by the insulator. The disposing of the insulator and the installing of the outer shell may occur any order as appropriate.

The outer half-shells are affixed together, as further discussed above, around the insulated inner shell to form the filter box, with the insulator being compressed between the outer shell and the inner shell and insulating and sealing the inner shell from the outer shell.

The door 109 (discussed above) may be provided with the insulated filter box.

As illustrated in FIG. 14, FIG. 16 and FIG. 18, after installing the inner shell 105 into the outer shell 103, the flange 111 protrudes the airflow channel to outside the outer shell 103, such that the flange 111 protrudes beyond the front end opening of the outer shell 103. As shown in FIG. 14, air entering the airflow channel enters from the front of the filter box 101 directly into the inner shell 105 which is insulated and spaced apart by the insulator from the outer shell 103 such that the outer shell 103 and inner shell 105 do not directly contact each other. Contact between the outer shell 103 and inner shell 105 is limited indirect contact through the insulator which is sandwiched therebetween.

The foregoing may be performed as a production step, so as to provide production insulated filter boxes ready to install.

The inner shell and the outer shell do not directly touch each other at any point; that is, there is no thermal breach between the inner shell and the outer shell. By having the above configuration around the filter box, the system prevents thermal breach between inner and outer metal shells; a thermal breach is any thermal contact between cold inside air and warmer outside air (for eliminating condensation).

Reference is now made to FIG. 18, illustrating an air conditioning apparatus 1300 which includes an air handler 1301. The filter box 101 may be mounted, for example, by the adaptor 113 to, for example, an air intake opening of the air handler 1301.

The filter box 101 may include a common access door through the inner shell 105, insulator and outer shell 103, discussed in more detail above. One or more filters, here represented by two filters 121a, 121b, are slidably transferred into the airflow channel through the common access door with the door 109 in an open position as illustrated in FIG. 18.

The door 109 to the common access door may be closed as illustrated in FIG. 19 to seal the common access door to the air flow channel. FIG. 19 is a side view illustrating the air conditioning apparatus 1300 in operation with the filter box 101 installed on the air handler 1301. The air conditioning apparatus 1300 and/or air handler 1301 may be operated to force air (represented in FIG. 19 by the arrows) through the at least one filter 121 which is confined in the air channel. The air is sucked in through the upstream side of the flange 111, then flows through the filter 121 in the air channel which flows through the inner shell 105, then through the adaptor 113, and then into the air handler 1301 through the air intake opening, without contacting the outer shell 103. Because the outer shell 103 (which is warmer) and the inner shell 105 (which is colder) are insulated from each other by the sandwiched insulator, and because the outer shell 103 and the inner shell 105 do not touch each other, the difference in temperature of the warmed outer shell which is and the cooled inner shell does not have an opportunity to cause condensation.

Accordingly, the above structure and method solve a condensation problem that reduces or eliminates condensation in cold conditions. The above provides an insulated filter box, which may have a compact design, and which may be ready to install in the field and does not need further insulation.

This disclosure is intended to explain how to fashion and use various embodiments in accordance with, not limit, the true, intended, and fair scope and spirit thereof. The foregoing description is not intended to be exhaustive, or limited to, the precise form disclosed. Modifications or variations are possible in light of the above teachings. The embodiments above are chosen and described to provide illustration of the principles as practical applications, and to enable one of ordinary skill in the art to utilize the various embodiments and with various modifications as are suited to the particular use contemplated. All such modifications and variations are within the scope of the disclosure as determined by the appended claims, as may be amended during the pendency of this application for patent, and all equivalents thereof, when interpreted in accordance with the breadth to which they are fairly, legally, and equitably entitled.

What is claimed:

1. A filter box adapted for mounting to an air intake opening of an air handler, the filter box is adapted to receive at least one filter therein, the filter box comprising:
   an inner shell adapted to confine the at least one filter therein, the inner shell defining an airflow channel from a front end opening of the inner shell through the at least one filter to a rear end opening of the inner shell;
   an insulator; and
   an outer shell defining a chamber from a front end opening of the outer shell to a rear end opening of the outer shell, wherein
   the outer shell contains the inner shell in the chamber and the insulator is sandwiched between the outer shell and the inner shell,
   the inner shell and the outer shell are separated and spaced apart all over by the insulator and the insulator insulates and seals the inner shell from the outer shell, and
   the front end opening of the inner shell comprises a flange that protrudes the airflow channel beyond outside the outer shell, the flange protrudes beyond the front end opening of the outer shell.

2. The filter box of claim 1, wherein the outer shell includes a front outer half-shell and a rear outer half-shell fastened together around the insulated inner shell, and the insulator is compressed between the outer shell and the inner shell.

3. An air conditioning apparatus, comprising:
   an air handler; and
   the filter box of claim 1 mounted to the air intake opening of the air handler.

4. The air conditioning apparatus of claim 3, further comprising the at least one filter confined in the filter box.

5. A filter box adapted for mounting to an air intake opening of an air handler, the filter box is adapted to receive at least one filter therein, the filter box comprising:
   an inner shell adapted to confine the at least one filter therein, the inner shell defining an airflow channel from a front end opening of the inner shell through the at least one filter to a rear end opening of the inner shell;
   an insulator; and
   an outer shell defining a chamber from a front end opening of the outer shell to a rear end opening of the outer shell, wherein
   the outer shell contains the inner shell in the chamber and the insulator is sandwiched between the outer shell and the inner shell, and
   the inner shell and the outer shell are separated and spaced apart all over by the insulator and the insulator insulates and seals the inner shell from the outer shell,
   further comprising a common access door through the inner shell, insulator and outer shell, the common access door in an opened position slidably receives the at least one filter into the airflow channel, the common access door in a closed position seals the common access door to the airflow channel.

6. The filter box of claim 5, wherein the outer shell includes a front outer half-shell and a rear outer half-shell fastened together around the insulated inner shell, and the insulator is compressed between the outer shell and the inner shell.

7. A filter box adapted for mounting to an air intake opening of an air handler, the filter box is adapted to receive at least one filter therein, the filter box comprising:
   an inner shell adapted to confine the at least one filter therein, the inner shell defining an airflow channel from a front end opening of the inner shell through the at least one filter to a rear end opening of the inner shell;
   an insulator; and
   an outer shell defining a chamber from a front end opening of the outer shell to a rear end opening of the outer shell, wherein
   the outer shell contains the inner shell in the chamber and the insulator is sandwiched between the outer shell and the inner shell,
   the inner shell and the outer shell are separated and spaced apart all over by the insulator and the insulator insulates and seals the inner shell from the outer shell, and
   the inner shell further comprises an adaptor that positions the airflow channel of the inner shell to the air intake opening.

8. The filter box of claim 7, further comprising a filter gasket that seals the airflow channel of the inner shell to the adaptor, and a unit gasket that seals the adaptor to the air intake opening.

9. The filter box of claim 7, wherein the outer shell includes a front outer half-shell and a rear outer half-shell fastened together around the insulated inner shell, and the insulator is compressed between the outer shell and the inner shell.

10. A method of insulating a filter box for an air handler, comprising:
    providing an inner shell adapted to confine at least one filter therein, the inner shell defining an airflow channel from a front end opening of the inner shell through the at least one filter to a rear end opening of the inner shell;
    disposing an insulator on the inner shell;
    installing around the insulated inner shell, a front outer half-shell and a rear outer half-shell to form an outer shell that defines a chamber from a front end opening of the outer shell to a rear end opening of the outer shell, the outer shell contains the insulated inner shell in the chamber and the insulator is sandwiched between the outer shell and the inner shell, the inner shell and the outer shell are separated and spaced apart all over by the insulator; and
    affixing together the front outer half-shell and the rear outer half-shell around the insulated inner shell to form the filter box, the insulator is compressed between the outer shell and the inner shell and insulates and seals the inner shell from the outer shell,
    further comprising, prior to providing the inner shell,
    assembling, in this order, a filter gasket on the rear end opening of the inner shell, an adaptor on the filter gasket, and a unit gasket on the adaptor.

11. The method of claim 10, wherein the filter box includes a common access door through the inner shell, insulator and outer shell, the method further comprising
    slidably transferring the at least one filter into the airflow channel through the common access door in an open position; and
    closing the common access door to seal the common access door to the air flow channel.

12. The method of claim 10, further comprising, after forming the filter box,
    mounting the adaptor to an air intake opening of the air handler.

13. The method of claim 10, wherein the inner shell comprises a flange protruding forward at the front end opening of the inner shell, after installing the inner shell, the flange protrudes the airflow channel to outside the outer shell, wherein the flange protrudes beyond the front end opening of the outer shell.

14. The method of claim 10, further comprising:

mounting the filter box to an air intake opening of the air handler.

15. The method of claim 14, further comprising operating the air handler to force air through the at least one filter confined in the airflow channel.

\* \* \* \* \*